(12) United States Patent
Rodriguez Garcia et al.

(10) Patent No.: US 12,545,786 B2
(45) Date of Patent: Feb. 10, 2026

(54) PLANT BASED FUNCTIONAL MATERIALS

(71) Applicant: CAMBRIDGE ENTERPRISE LIMITED, Cambridge (GB)

(72) Inventors: Marc Rodriguez Garcia, Cambridge (GB); Tuomas Knowles, Cambridge (GB); Aviad Levin, Cambridge (GB); Ayaka Kamada, Cambridge (GB)

(73) Assignee: CAMBRIDGE ENTERPRISE LIMITED, Cambridge (GB)

( * ) Notice: Subject to any disclaimer, the term of this patent is extended or adjusted under 35 U.S.C. 154(b) by 862 days.

(21) Appl. No.: 17/436,475

(22) PCT Filed: Mar. 6, 2020

(86) PCT No.: PCT/EP2020/056117
§ 371 (c)(1),
(2) Date: Sep. 3, 2021

(87) PCT Pub. No.: WO2020/178448
PCT Pub. Date: Sep. 10, 2020

(65) Prior Publication Data
US 2022/0169858 A1    Jun. 2, 2022

(30) Foreign Application Priority Data
Mar. 7, 2019 (GB) .................................. 1903090
Jun. 5, 2019 (WO) ................. PCT/EP2019/064711

(51) Int. Cl.
| | | |
|---|---|---|
| *C08L 89/00* | (2006.01) | |
| *A23L 33/185* | (2016.01) | |
| *C08J 3/075* | (2006.01) | |
| *C08J 5/18* | (2006.01) | |
| *C09D 189/00* | (2006.01) | |

(52) U.S. Cl.
CPC ............ *C08L 89/00* (2013.01); *A23L 33/185* (2016.08); *C08J 3/075* (2013.01); *C08J 5/18* (2013.01); *C09D 189/00* (2013.01); *A23V 2002/00* (2013.01); *C08J 2389/00* (2013.01); *C08L 2203/02* (2013.01); *C08L 2203/14* (2013.01); *C08L 2203/16* (2013.01)

(58) Field of Classification Search
CPC .. C08L 89/00; C08L 2203/02; C08L 2203/14; C08L 2203/16; A23L 33/185; C08J 3/075; C08J 5/18; C08J 2389/00; C09D 189/00; A23V 2002/00
See application file for complete search history.

(56) References Cited

U.S. PATENT DOCUMENTS

| | | | |
|---|---|---|---|
| 2009/0269456 A1 | 10/2009 | Kiriyama | |
| 2016/0256604 A1* | 9/2016 | Hanna | ...................... A61K 9/06 |
| 2018/0105659 A1 | 4/2018 | Hu | |

FOREIGN PATENT DOCUMENTS

| | | |
|---|---|---|
| CN | 1143941 A | 2/1997 |
| CN | 1921770 A | 2/2007 |
| CN | 109316440 A | 2/2019 |
| EP | 1738654 A1 | 1/2007 |
| JP | H05309261 A | 11/1993 |
| JP | H11308969 A | 11/1999 |
| JP | 2022524365 A | 5/2022 |
| KR | 10-2018-0104386 A | 9/2018 |
| KR | 20180104386 A | 9/2018 |
| WO | 2005082156 A1 | 9/2005 |
| WO | 2009105753 A1 | 8/2009 |
| WO | 2015054125 A1 | 4/2015 |
| WO | 2015/067763 A1 | 5/2015 |
| WO | 2015/104414 A1 | 7/2015 |
| WO | 2016096929 A1 | 6/2016 |

OTHER PUBLICATIONS

Yuan Zou, Runting Pan, Zhili Wan, Jian Guo, Jinmei Wang & Xiaoquan Yang. "Gel-like emulsions prepared with zein nanoparticles produced through phase separation from acetic acid solutions," International Journal of Food Science and Technology 2017, 52, 2670-2676 (Year: 2017).*
N. Hettiarachchy, A. Kannan, C. Schafer, and G. Wagner. "Gelling of Plant Based Proteins," Chapter 8 of Product Design and Engineering: Formulation of Gels and Pastes, edited by Ulrich Brockel, Gerhard Wagner, and Willi Meier, John Wiley and Sons, 2013, pp. 221-245. (Year: 2013).*
Y. Wang, T. D. Wig, J. Tang, L. M. Hallberg. "Dielectric properties of foods relevant to RF and microwave pasteurization and sterilization," Journal of Food Engineering 57 (2003) 257-268. (Year: 2003).*
Chien et al., Investigation of soy protein hydrogels for biomedical applications: materials characterization, drug release, and biocompatibility. J Biomater Appl. Mar. 2014;28(7):1085-96.
Pochan et al., Thermally reversible hydrogels via intramolecular folding and consequent self-assembly of a de novo designed peptide. J Am Chem Soc. Oct. 1, 2003;125(39):11802-3.
Reddy et al., Potential of plant proteins for medical applications. Trends Biotechnol. Oct. 2011;29(10):490-8.
Rodriguez et al., All-natural plant-based microcapsules for food applications. University of Cambridge, 2 pages. Jun. 7, 2018.
Tansaz et al., Hydrogel films and microcapsules based on soy protein isolate combined with alginate. Journal of Applied Polymer Science. Jan. 20, 2017;134(4):44358, 9 pages.
Tansaz et al., Soy Protein-Based Composite Hydrogels: Physico-Chemical Characterization and In Vitro Cytocompatibility. Polymers (Basel). Oct. 17, 2018;10(10):1159, 19 pages.
Great Britain Office Action for Application No. GB1903090.7, dated Aug. 1, 2019, 4 pages.
International Search Report and Written Opinion for Application No. PCT/EP2019/064711, dated Feb. 19, 2020, 14 pages.

(Continued)

*Primary Examiner* — Michael P Cohen
(74) *Attorney, Agent, or Firm* — Merchant & Gould P.C.

(57) ABSTRACT

The present invention relates to plant based materials, methods for their manufacture and biomaterials incorporating plant based materials.

7 Claims, 19 Drawing Sheets

(56) References Cited

OTHER PUBLICATIONS

International Search Report and Written Opinion for Application No. PCT/EP2020/056117, dated Jun. 2, 2020, 16 pages.

Yuan, Zou & Pan, Runting & Wan, Zhili & Guo, Jian & Jinmei, Wang & Yang, Xiaoquan. (2017). Gel-like emulsions prepared with zein nanoparticles produced through phase separation from acetic acid solutions. International Journal of Food Science & Technology. 52. 10.1111/ijfs. 13558, 7 pgs.

Bröckel, U. & Meier, W. & Wagner, G .. (2013). Product Design and Engineering: Formulation of Gels and Pastes. "Gelling of Plant Based Proteins," Chapter 8, pp. 221-245, 10.1002/9783527654741, 25 pgs.

Wang, Yifen & Wig, Timothy & Tang, Juming & Hallberg, Linnea. (2003). Dielectric properties of food relevant to RF and microwave pasteurization and sterilization. Journal of Food Engineering. 57. 257-268. 10.1016/S0260-8774(02) 00306-0, 12 pgs.

Micsonai, A. et al., Accurate secondary structure prediction and fold recognition for circular dichroism spectroscopy, 9 pgs.

Reddy, N., & Yang, Y. (2011). Potential of plant proteins for medical applications. Trends in biotechnology, 29(10), 490-498 published on Jun. 13, 2011, 9 pgs.

Tansaz, S., Durmann, A. K., Detsch, R., & Boccaccini, A. R. (2017). Hydrogel films and microcapsules based on soy protein isolate combined with alginate. Journal of applied polymer science, 134(4) published on Sep. 23, 2016, 9 pgs.

Chien, K. B., Chung, E. J., & Shah, R. N. (2014). Investigation of soy protein hydrogels for biomedical applications: Materials characterization, drug release, and biocompatibility. Journal of biomaterials applications, 28(7), 1085-1096 published on Jul. 30, 2013, 12 pgs.

Tansaz, S., Singh, R., Cicha, I., & Boccaccini, A. R. (2018). Soy protein-based composite hydrogels: physicochemical characterization and in vitro cytocompatibility. Polymers, 10(10), 1159 published on Oct. 17, 2018, 19 pgs.

\* cited by examiner

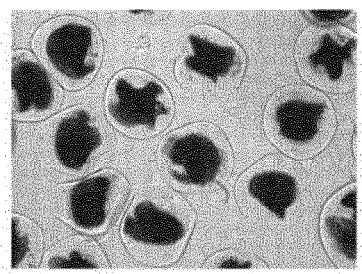 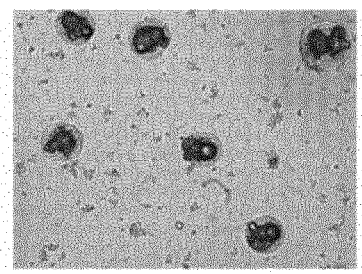 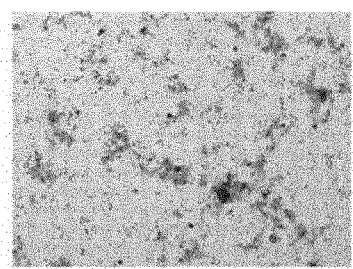
Fig. 10a          Fig. 10b          Fig. 10c
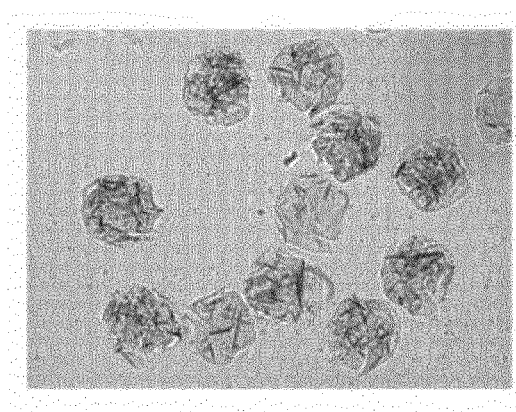
Fig. 11a
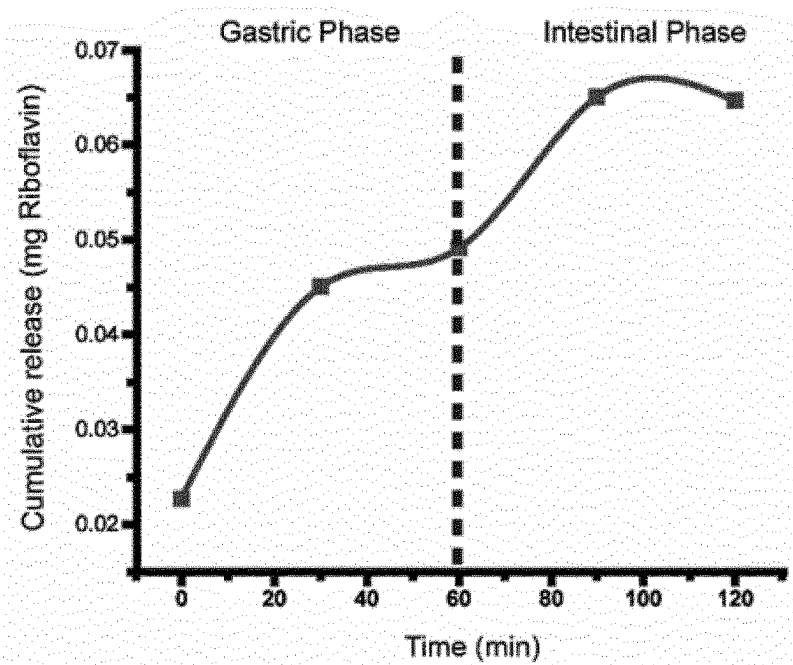
Fig. 11b

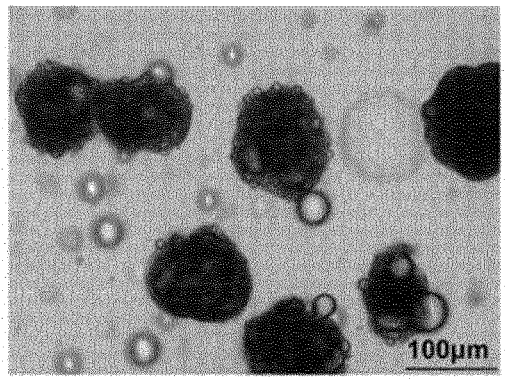 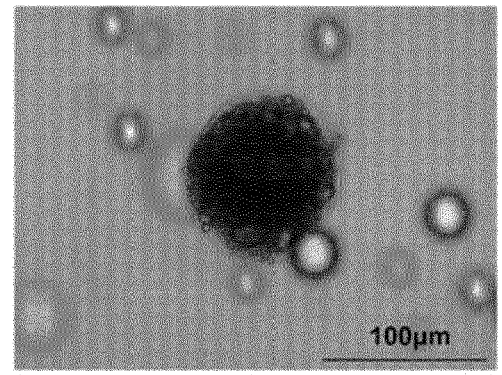
Fig. 12a          Fig. 12b
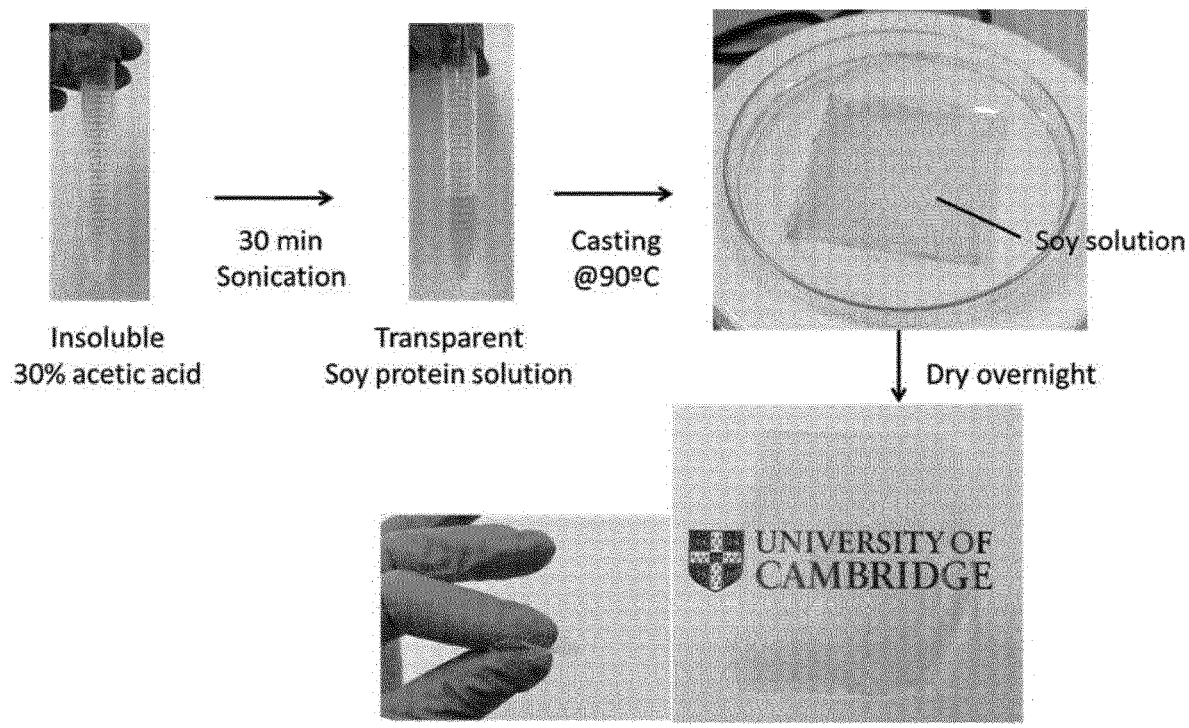
Fig. 13

PLANT BASED FUNCTIONAL MATERIALS

RELATED APPLICATIONS

This application is a 35 U.S.C. § 371 national stage filing of International Application No. PCT/EP2020/056117, filed on Mar. 6, 2020, which in turn claims the benefit of United Kingdom Patent Application No. 1903090.7, filed on Mar. 7, 2019 and International Application No. PCT/EP2019/064711, filed on Jun. 5, 2019. The entire contents of each of the foregoing applications are incorporated herein by reference.

FIELD OF THE INVENTION

The present invention relates to plant based materials, methods for their manufacture and biomaterials incorporating plant based materials according to the present invention.

BACKGROUND TO THE INVENTION

Synthetic polymers such as plastic exhibit excellent mechanical and chemical properties and have been widely used during the last 60 years. However, these polymers are not biodegradable and can accumulate in the environment, causing economic damage, and likely affecting human health through the food chain and air.

The development of materials that exhibit a high level of functionality as well as a high-degree of biodegradability and biocompatibility is a key objective to satisfy a societal need for improved material performance in areas ranging from packaging to pharmaceuticals.

Self-assembly has emerged as an attractive route towards the fabrication of such materials, but most of the building blocks exploited to date have been synthetic in origin.

Amongst the different types of biopolymers that could serve as building blocks to generate new functional materials, proteins are interesting candidates given their ability to self-assemble into functional structures.

Currently, the use of these materials for commercial application is restricted to highly soluble, animal-derived proteins. Commonly used animal-based proteins in food products, such as whey protein, exhibit good biocompatibility, biodegradability, amphiphilic and functional properties such as water solubility, emulsifying and foaming capacity. However, there is an increasing demand for replacing animal-derived proteins for plant-based ones, not only due to their lower environmental impact but also due to their lower allergenicity and reduced cost.

The formation of self-assembled materials from plant-based proteins has been reported, where hydrogels can be obtained from soy and pea proteins under a range of experimental conditions. However, the mechanical properties obtained from structured plant-based materials are generally lower in comparison to the ones obtained from animal-derived ones; and the plant proteins are more difficult to process, at least in part due to their inherent low solubility in water.

Thus, to date, plant based proteins have not been successfully utilised as a biomaterial and it remains a challenge to generate structured protein materials from renewable and cost-effective sources, and with environmentally sustainable methods.

SUMMARY OF THE INVENTION

According to an aspect of the present invention, there is provided a method to produce plant based materials comprising:

a) forming a solution comprising one or more plant based protein(s) in a solvent system, wherein the solvent system comprises miscible co-solvents; wherein a first co-solvent increases solubility of the plant based protein(s), and a second co-solvent decreases solubility of the plant based protein(s); and b) inducing the protein in the solution to undergo a sol-gel transition to form a plant-based protein hydrogel.

In a further embodiment, the method includes the step:

c) forming the plant-based protein hydrogel into a structured material.

Forming the plant-based protein hydrogel into a structured material allows for the formation of structured materials, such as gels, films, microgels, microcapsules and the like. In a preferred embodiment, the protein hydrogel may be formed into a specified shape by molding. In a further preferred embodiment, the protein hydrogel may be formed into a specified shape using a microfluidic device.

The present invention has identified a novel method to manufacture functional materials from plant-based proteins. By utilising co-solvent mixtures it is possible to exert control over the sol-gel transition allowing for the formation of structurally robust materials from renewable plant protein sources. The process allows for the creation of many structured materials, including hydrogels, films, microcapsules, microgels, microscale-sponges and the like. Structured materials can be reliably formed without the need for cross-linkers or any other hazardous materials making them suitable for contact with the human body. The materials are also derived from renewable source so reduce the environmental impact over synthetic analogues.

In a further aspect there is provided the use of co-solvent mixtures to modify the properties of a plant-based protein in solution to control sol-gel conditions and thereby form plant based materials.

By selecting a solvent system comprises miscible co-solvents, wherein a first co-solvent increases solubility of the plant based protein(s), and a second co-solvent decreases solubility of the plant based protein(s), it is possible to control the sol-gel conditions.

The ratio of first co-solvent to second co-solvent may vary from about 20-80% v/v, about 20-60% v/v, about 25-55% v/v, about 30-50% v/v, about 20%, about 30%, about 40% about 50% or about 60% v/v, most preferably about 30-50% v/v. Such ratios lead to functionally useful materials.

The solvent system may contain one or more first co-solvent(s) and/or one or more second co-solvent(s).

For the first time, plant-based materials can be reliably and reproducibly formed using a scalable process. By being able to control the sol-gel conditions, it is possible to tune the properties of the resultant material and/or tune the manufacturing process to allow for the production of useful biomaterials.

The process according to the present invention allows for the formation of plant-based structured materials formed via a thermoreversible cold-set gelation process. The plant-based structured materials may be plant-based protein supramolecular structures; or may be a 3-dimensional network of aggregated and entangled plant-based protein supramolecular structures.

A thermoreversible cold-set gelation process may be considered a process wherein the plant-based protein molecules can be heated to above a temperature to form a liquid solution which can be processed into the desired configuration before cooling the liquid solution to enable a sol-gel transition forming a network of self-assembled protein aggregates held by non-covalent intermolecular interactions.

Thus, the gelation process according to the present invention does not require covalent chemical cross-linking and is therefore reversible. The present invention includes a thermoreversible cold gelling process.

Thus, in a further aspect there is provided a plant-based structured material formed via a thermoreversible cold-set gelation process; wherein the structured material may optionally be a film, a thin film, a micropatterned film (or thin film), a micro or nanostructured thin film, a microgel, a microcapsule, a microbead, a bioscaffold, a bio-support, a sponge, a microscale-sponge, a hard capsule, or a functional coating.

In a further aspect there is provided a plant based thermally reversible gel.

In a further aspect there is provided a plant based thermally reversible hydrogel.

In a further aspect there is provided a composite material comprising a plant based material according to the present invention, and one or more further biopolymers, for example proteins, polysaccharides and the like.

In a further aspect there is provided materials made according to the method of the present invention.

The plant based material of the present invention and the processes for manufacturing them allow for precise control of the sol-gel transition thereby opening the use of plant-based proteins to form biomaterials that, to date, have only successfully been manufactured using animal derived proteins. Suitable biomaterials include films, microbeads, microcapsules, scaffolds, gels, sponges and the like.

In a further aspect there is provided a microbead comprising a plant-based material according to the present invention.

In a further aspect there is provided a microcapsule comprising a plant based material according to the present invention.

In a further aspect there is provided a hard capsule comprising a plant based material according to the present invention.

In a further aspect there is provided a sponge, or microscale-sponge comprising a plant based material according to the present invention.

In a further aspect there is provided a film, preferably a thin film, comprising a plant based material according to the present invention.

In a further aspect there is provided a nanopatterned or micropatterned film comprising a plant based material according to the present invention.

In a further aspect there is provided a bioscaffold comprising a plant-based hydrogel according to the present invention.

In a further aspect there is provided a functional coating comprising a plant-based hydrogel according to the present invention.

In a further aspect there is provided a foodstuff, a cosmetic, a pharmaceutical or a medical device incorporating a plant-based material according to the present invention.

In a further aspect there is provided a thermoreversible process to obtain plant based materials comprising:

a) forming a solution comprising one or more plant based protein(s) in a solvent system, wherein the solvent system comprises miscible co-solvents; wherein a first co-solvent increases solubility of the plant based protein(s), and a second co-solvent decreases solubility of the plant based protein(s); and b) inducing the protein in the solution to undergo a sol-gel transition to form a plant-based protein hydrogel.

Once the material has been obtained, the thermoreversible properties may be removed from the material.

BRIEF DESCRIPTION OF THE DRAWINGS

FIG. 10 shows the results of simulated degradation with FIG. 10a showing the microcapsules in aqueous solution; FIG. 10b showing the microcapsules after 60 minutes in SGF (simulated gastric fluid); and FIG. 10c showing the microcapsules after 120 minutes in SIF (simulated intestinal fluid);

FIG. 11a shows core-shell microcapsules containing a core comprised of a riboflavin solution in 1% (w/w) HMP pectin; FIG. 11b shows the results of a two-stage in vitro digestibility study following by HPLC analysis showing cumulative release of riboflavin under simulated conditions;

FIG. 12a shows a distribution of fragrance-oil loaded plant-based protein microscale-sponges. FIG. 12b shows a single fragrance-loaded plant-based protein microscale-sponge at higher magnification (20×), where the protein microgel shell can be easily observed;

FIG. 13 shows a schematic representation of an example generating stable protein films;

DETAILED DESCRIPTION

Figure 1:
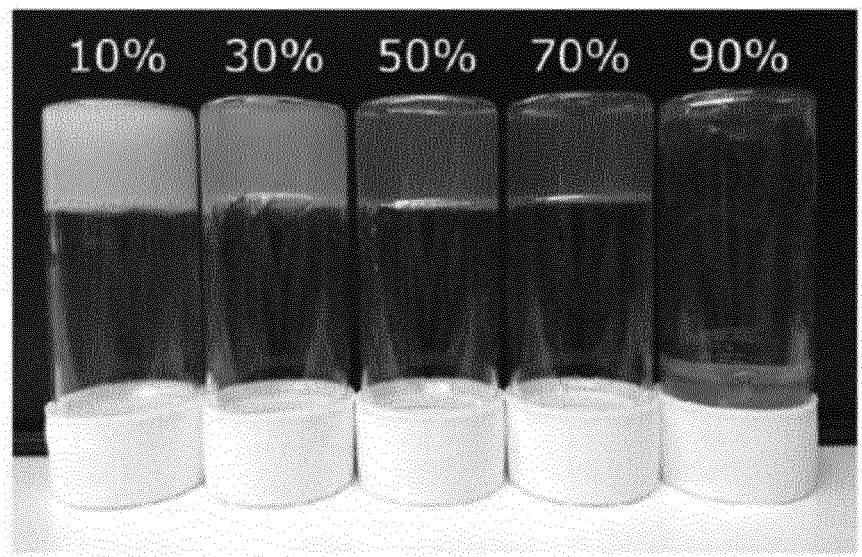
FIG. 1 shows soy protein isolates (SPI) hydrogels formed under varying acetic acid/DI water co-solvent ratios.

The following features apply to all aspects of the invention.

Any suitable plant-based proteins may be used in the present invention. Suitable plant sources include soybean, pea, rice, potato, wheat, corn zein, sorghum, and the like.

Particular plant proteins include soy proteins and pea proteins.

Suitable plant-based proteins further include:
Brassicas: including *Brassica balearica*: Mallorca cabbage, *Brassica carinata*: Abyssinian mustard or Abyssinian cabbage, *Brassica elongata*: elongated mustard, *Brassica fruticulosa*: Mediterranean cabbage, *Brassica hilarionis*: St Hilarion cabbage, *Brassica juncea*: Indian mustard, brown and leaf mustards, Sarepta mustard, *Brassica napus*: rapeseed, canola, rutabaga, *Brassica narinosa*: broadbeaked mustard, *Brassica nigra*: black mustard, *Brassica oleracea*: kale, cabbage, collard greens, broccoli, cauliflower, kai-lan, Brussels sprouts, kohlrabi, *Brassica perviridis*: tender green, mustard spinach, *Brassica rapa* (syn. *B. campestris*): Chinese cabbage, turnip, rapini, komatsuna, *Brassica rupestris*: brown mustard, *Brassica tournefortii*: Asian mustard Solanaceae: including tomatoes, potatoes, eggplant, bell and chili peppers;

cereals: including maize, rice, wheat, barley, sorghum, millet, oats, rye, triticale, fonio pseudocereals: including amaranth (love-lies-bleeding, red amaranth, prince-of-Wales-feather), breadnut, buckwheat, chia, cockscomb (also called quail grass or soko), pitseed Goosefoot, qañiwa, quinoa and, wattleseed (also called acacia seed);

Legume: including *Acacia alata* (Winged Wattle), *Acacia decipiens*, *Acacia saligna* (commonly known by various names including coojong, golden wreath wattle, orange wattle, blue-leafed wattle), *Arachis hypogaea* (peanut), *Astragalus galegiformis*, *Cytisus laburnum* (the common *laburnum*, golden chain or golden rain), *Cytisus supinus*, *Dolichios lablab* (common names include hyacinth bean, lablab-bean bonavist bean/pea, dolichos bean, seim bean, lablab bean, Egyptian kidney bean, Indian bean, bataw and Australian pea.), Ervum lens (Lentil), *Genista tinctorial* (common names include dyer's whin, waxen woad and waxen wood), *Glycine max* (Soybean), *Lathyrus clymenum* (peavines or vetchlings), *Lathyrus odoratus* (peavines or vetchlings), *Lathyrus staivus* (peavines or vetchlings), *Lathyrus Silvetris* (peavines or vetchlings), *Lotus tetragonolobus* (asparagus-pea or winged pea), *Lupinus albus* (Lupin), *Lupinus angustifolius* (lupin), *Lupinus luteus* (Lupin), *Lupinus polyphyllus* (Lupin), *Medicago sativa* (Alfalfa), *Phaseolus aureus* (Mung bean), *Phaseolus coccineus* (Runner bean), *Phaseolus nanus* (Green bean/French bean), *Phaseolus vulgaris* (Green bean/French bean), *Pisum sativum* (pea), *Trifolium hybridum* (Clover), *Trifolium pretense* (Red clover), *Vicia faba* (Broad bean), *Vicia sativa* (Vetch), *Vigna unguiculate* (cowpea)

Non-Legumes: including: *Acanshosicyos horrida* (Acanshosicyos horrida), *Aesculus hyppocastanum* (Conker tree/Horsechestnut), *Anacardium occidentale* (Cashew tree), *Balanites aegyptica*, *Bertholletia excels* (Brazil nut), *Beta vulgaris* (Sugar beet), *Brassica napus* (Rapeseed), *Brassica juncea* (Brown mustard), *Brassica nigra* (Black mustard), *Brassica hirta* (Eurasian mustard), *Cannabis sativa* (marijuana), *Citrullus vulgaris* (Sort of watermelon), *Citrus auranticaa* (Citrus), *Cucurbita maxima* (squash), *Fagopyrum esculentum* (knotweed), *Gossypium barbadense* (Extra long staple cotton), *Heianthus annuus* (sunflower), *Nicotiana* sp. (Tobacco plant), *Prunus avium* (cherry), *Prunus cerasus* (Sour cherry), *Prunus domestica* (plum), *Prunus amygdalus* (almond), *Rricinus communis* (Caster bean/caster oil plant), *Sasamum indicum* (Sesame), *Sinapis alba* (White mustard), *Terlfalrea pedata* (Oyster nut).

For the avoidance of doubt, the plant based structured materials according to the present invention do not encompass plants in their natural state. E.g. naturally formed plant cells, organelles or vesicles are not plant based structured materials of the present invention.

A feature of plant derived proteins is their inherent poor solubility in water. To date, this has limited their use in generating biomaterials. However, the present invention has overcome the previous limitations associated with such proteins.

In methods according to the present invention the material is formed by adding the plant-based protein into a solvent system, wherein the solvent system comprises two or more miscible co-solvents as defined herein.

The first co-solvent increases solubility of the plant based protein(s). The first co-solvent may be considered a solubilising co-solvent. There may be one or more solubilising co-solvent(s) and the solubilising co-solvent(s) may fully or partially solubilise the plant based protein(s).

Examples of solubilising co-solvents are organic acids. An organic acid is an organic compound with acidic properties. Suitable organic acids include acetic acid or an α-hydroxy acid. Suitable α-hydroxy acids include glycolic acid, lactic acid, malic acid, citric acid and tartaric acid. Preferred organic acids are acetic acid and lactic acid. Using an organic acid enables solubilisation of the plant protein and also allows for mild hydrolysis of the protein. For example, without wishing to be bound by theory, the solubility of plant-based proteins in organic acid is possible due to: i) the protonation of proteins and ii) the presence of an anion solvation layer which contributes to a reduction of hydrophobic interactions. Once initially dissolved in organic acid, the protonation of plant-based proteins can help to stabilise them in its non-solvent, for example water.

In a preferred embodiment, the first co-solvent is an organic acid.

The second co-solvent has decreased solubility of the plant based protein(s), as compared to the first co-solvent. The second co-solvent may be considered a de-solubilising co-solvent. There may be one or more de-solubilising co-solvent(s).

Examples of de-solubilising second co-solvent(s) are an aqueous buffer solution. In a further embodiment, the second co-solvent may be ethanol, methanol, acetone, acetonitrile, dimethylsulfoxide, dimethylformamide, formamide, 2-propanol, 1-butanol, 1-propanol, hexanol, t-butanol, ethyl acetate or hexafluoroisopropanol. In a particularly preferred embodiment, the second co-solvent is water and ethanol. In a further particularly preferred embodiment, the second co-solvent is water.

In a preferred embodiment, the concentration of plant based protein(s) in the solvent system is 25-200 mg/ml, preferably 50-150 mg/ml. The ratio of organic acid may vary depending on protein concentration, e.g. using a higher organic acid ratio with increasing protein concentration.

In a preferred embodiment, the degree of protein hydrolysis is controlled to modify the properties of the resultant hydrogel. For example, increasing the acid concentration present during formation will increase the degree of protein hydrolysis. Higher degree of protein hydrolysis leads to the formation of less rigid hydrogels.

In order to form the solution comprising one or more plant based protein(s), it may be necessary to apply physical stimulus to the protein/solvent system mixture to enable dissolution of the protein. Suitable physical stimulus includes ultrasonication, agitation, high-shear mixing or other physical techniques. A preferred technique is ultrasonication.

In an embodiment, the solution is subjected to ultrasonication for a period of about 5 minutes, 10 minutes, 15 minutes, 20 minutes, 25 minutes, 30 minutes, or greater than 30 minutes. A preferred ultrasonication time period is about 30 minutes.

The protein solution is heated such that the liquid solution is held above the sol-gel transition for the protein(s). By modifying the solvent system (for example through selection of the choice of organic acid, the ratio of organic acid to further solvent or through further means) it is possible to modify the sol-gel transition temperature for the protein(s). Through appropriate selection of conditions, it is possible to carefully control the sol-gel transition of the protein thereby controlling the formation of the hydrogel.

In an embodiment, the protein solution is heated to about or above 70° C. In a further embodiment, the protein is heated to about or above 75° C., about or above 80° C., about or above 85° C. or about 90° C. In a preferred embodiment, the protein is heated to 85° C.

The protein solution may be held at elevated temperature for a time period of about 5 minutes, 10 minutes, 15 minutes, 20 minutes, 25 minutes, 30 minutes, 45 minutes or 1 hour. A preferred time period is at least 30 minutes to enable the proteins to fully solubilise. It is possible to hold the protein solution at an elevated temperature for a longer period of time. This may be useful for a commercial batch process or for use in a fluidic processing step where it is necessary to retain the protein solution in liquid form for higher periods of time.

Having heated the protein solution to above the sol-gel transition temperature of the protein, the temperature of the protein solution can be reduced to a second temperature below the sol-gel transition temperature to facilitate formation of the hydrogel. The second temperature may be room temperature. The protein solution may be held at the reduced temperature for a time period of about 5 minutes, 10 minutes, 15 minutes, 20 minutes, 25 minutes or about 30 minutes. A particular reduced time period is about 5 minutes. However the method of the present invention allows the protein to remain in solution for long periods of time. As such, depending on need, the protein solution can be kept above the sol-gel transition temperature for as long as required to retain the protein in liquid form. This could be hours, days or more. Also, since the reaction is reversible, a solution could, for example be kept at a lower temperature (for example room temperature) where a hydrogel will form but thereafter heated to above the sol-gel transition temperature to return the solution to a liquid state for further processing. Protein hydrogels in this way could be stored for hours, days, weeks, months or years as the hydrogel remains stable for a long time.

The particular temperatures will depend on the properties of the protein source, the solvent conditions used and therefore the sol-gel transition temperature. Alternatively, the elevated and reduced temperatures may be relatively fixed (for example about 85° C. then about room temperature) and the co-solvent mixture conditions are adjusted to ensure a suitable sol-gel transition temperature for the selected plant-based protein.

Thus, in an embodiment there is provided a method for forming a plant based material comprising:
  a) forming a protein solution comprising one or more plant based protein(s) and a solvent system, wherein the solvent system comprises miscible co-solvents; wherein a first co-solvent increases solubility of the plant based protein(s), and a second co-solvent decreases solubility of the plant based protein(s);
  b) subjecting the protein solution to mechanical agitation for a period of time, for example ultrasonication;
  c) elevating the temperature of the protein solution to a first elevated temperature above the sol-gel transition temperature for a period of time. Said temperature elevation may be caused by the mechanical agitation in b) or may be from an external heat source;
  d) reducing the temperature of the protein solution to below the sol-gel transition temperature such that the plant based proteins self-aggregate into a hydrogel; and, optionally e) forming the hydrogel into a defined shape, for example microgels, microcapsules, microscale-sponges, films and the like. The formation step may be a molding step, namely molding the hydrogel into a defined shape. The formation step may use a microfluidic device.

The protein solution may be held at the elevated temperature in step c) while the solution is conformed to the desired final shape. For example, within a microfluidic device, the protein solution may be held at the elevated temperature c) within the device reservoir, but as the solution is expelled from the device its temperature reduces thereby forming a microgel or a microcapsule shell. Alternatively, the protein solution may be held at an elevated temperature while it is shaped in a suitable mould where after the temperature is reduced allowing the proteins to form into a hydrogel.

Without wishing to be bound by theory, it is believed that when the plant protein is added to the solvent system the plant protein form a highly viscous dispersion of insoluble colloidal protein aggregates Further, it is believed that the application of mechanical agitation, for example ultrasonication, disrupts large colloidal protein aggregates into smaller ones, as well as disrupting protein intermolecular interactions. Using this approach, the size of the protein aggregates can be significantly reduced to particle sizes below 100 nm. In an embodiment, the present invention comprises protein aggregates with an average size less than 200 nm, preferably less than 150 nm, less than 125 nm, less than 100 nm, less than 90 nm, less than 80 nm, less than 70 nm, less than 60 nm, less than 50 nm, less than 40 nm, or less than 30 nm.

Further, it is believed that upon heating the protein solution in the presence of a co-solvent system to above the sol-gel temperature, the plant proteins partially unfold, resulting in the exposure of hydrophobic amino acids initially buried within the protein native structure. Once partially unfolded, the co-solvents are able to interact with the unfolded protein molecules. For example, an organic acid has greater access to protonate amino acid residues, as well as enabling the formation of anion salt bridges that stabilise hydrophobic interactions. Also, upon heating at elevated temperatures, protein-protein non-covalent intermolecular contacts are disrupted. Further, it is believed that upon cooling the protein solution to below the sol-gel temperature, protein-protein non-covalent intermolecular contacts are enabled, thus promoting the self-assembly of plant protein molecules into a network of supramolecular aggregates.

It is believed that the process of the present invention allows the plant proteins to aggregate into supramolecular structures held by intermolecular hydrogen bonding interactions, and in particular between the β-strands.

The process of the present invention enables materials to be formed in which there are high levels of β-sheet intermolecular interactions. This leads to novel materials which have not previously been made.

In an embodiment, the plant based materials according to the present invention have a protein secondary structure with at least 40% intermolecular β-sheet, at least 50% intermolecular β-sheet, at least 60% intermolecular β-sheet, at least 70% intermolecular β-sheet, at least 80% intermolecular β-sheet, or at least 90% intermolecular β-sheet. In an embodiment, the plant based material is a film. In an embodiment, the plant based material is a dried material, for example a dried hydrogel. In an embodiment, the plant based material is a hydrogel or other material described herein. It is believed that previous gels made from plant based protein sources may have lower amounts of intermolecular β-sheets in the secondary structure, leading to prior art disadvantageous properties.

The plant based materials according to the present invention comprise β-sheet crystals. The plant based materials according to the present invention may demonstrate a high-degree of β-sheet crystalline structures. The plant based materials may comprise at least 40% β-sheet crystals, at least 50% β-sheet crystals, at least 60% β-sheet crystals, at least 70% β-sheet crystals, at least 80% β-sheet crystals, or at least 90% β-sheet crystals. In an embodiment, the plant based material is a film. In an embodiment, the plant based material is a dried material, for example a dried hydrogel. In an embodiment, the plant based material is a hydrogel or other material described herein.

The plant based materials having said high intermolecular β-sheet secondary structures and said plant based materials comprising β-sheet crystals, may be any of the materials described in the present invention, including, structured materials such as microcapsules, microbeads, bioscaffolds, bio-supports, sponges, microscale-sponges, hard capsules, or functional coatings and the like. They may also be films, thin films, micropatterned films (or thin films), micro or nanostructured thin films, or microgels and the like.

Thus, the present invention encompasses, for example, plant-based films having a protein secondary structure with at least 40% intermolecular β-sheet, at least 50% intermolecular β-sheet, at least 60% intermolecular β-sheet, at least 70% intermolecular β-sheet, at least 80% intermolecular β-sheet, or at least 90% intermolecular β-sheet. The same applies to other materials according to the present invention.

Further, the present invention encompasses, for example, plant-based films comprising plant-based β-sheet crystals, including at least 40% β-sheet crystals, at least 50% β-sheet crystals, at least 60% β-sheet crystals, at least 70% β-sheet crystals, at least 80% β-sheet crystals, or at least 90% β-sheet crystals. The same applies to other materials according to the present invention.

The present invention provides a plant-based structured material comprising a film, a thin film, a micropatterned film (or thin film), a micro or nanostructured thin film, a microgel, a microcapsule, a microbead, a bioscaffold, a bio-support, a sponge, a microscale-sponge, a hard capsule, or a functional coating.

The materials according to the present invention have advantageous mechanical properties. For example, the ability to reversibly change from gel to liquid upon temperature change enables advantageous manufacturing capabilities.

In an embodiment, the hydrogels produced according to the present invention have a storage modulus (G') at 10 rad/s of greater than 500 Pa, greater than 1000 Pa, greater than 2500 Pa, greater than 3000 Pa, greater than 4000 Pa.

In an embodiment, the hydrogels exhibit shear-thinning behaviour, where the viscosity decreases upon increasing shear rates.

In an embodiment, the hydrogels produced according to the present invention exhibit a unique thermoreversible gelling behaviour. Upon heating at elevated temperatures and/or by applying mechanical agitation, the protein gels return to liquid form. This is a unique property that has not been seen with prior hydrogels, which would not upon heating return to a fully liquid state. In contrast, gels made according to the present invention can. In an embodiment, upon heating at elevated temperatures and/or by applying mechanical agitation, protein solutions may have a storage modulus lower than 250 Pa, lower than 100 Pa, lower than 50 Pa, lower than 10 Pa. This enables both the materials and methods of the present invention to have unique manufacturing capabilities.

Equally, if desired, thermoreversibility can be removed by removing the solvent system of the present invention. For example, plant based microcapsules can be made using the methods of the present invention. Once formed, the solvent system can be washed out which will stop the thermoreversible properties of the microcapsules. Thus, if the microcapsules is thereafter heated it will remain stable and will not re-melt. This enables, for example, microcapsules according to the present invention to be subjected to high temperature processes yet remain intact and stable.

Thus the hydrogels formed according to the present invention have unique properties not seen in prior plant based hydrogels. These include the ability of forming hydrogels from plant-based proteins at high concentrations (i.e. 5%-15% w/w) from commercially available sources, and the ability of keeping such highly concentrated protein solutions in the liquid state upon heat denaturation, which enables their moulding into well-defined objects.

A feature of the materials of the present invention is that it is not necessary to provide cross-linking agents as the plant proteins will self-form hydrogels. In an embodiment of the present invention there is therefore provided a plant protein material (for example a hydrogel) which does not contain or does not substantially contain a cross-linking agent.

However, in an alternative embodiment, the hydrogels according to the present invention may comprise a cross-linking agent. Suitable cross-linking agents include microbial transglutaminase, glutaraldehyde, formaldehyde, glyoxal, phenolic compounds, epoxy compounds, genipin or dialdehyde starch.

Due to the porous network of the hydrogel, the solvent mixture within the hydrogel can be exchanged for another solvent mixture without compromising the mechanical stability of the hydrogel. A solvent-exchange process can be performed to remove the organic acid from the hydrogel porous network.

In an embodiment of the present invention, the method includes the step of exchanging the solvent system in which the plant-based protein hydrogel has formed for an alternative solvent system. In a further embodiment, this is performed using a solvent-exchange process. This step may be carried out after formation of the hydrogel but may be carried out after the hydrogel has been formed into a structured material (e.g. after step b) or c) of the method of the present invention). In a preferred embodiment, an aqueous buffer is used to replace an organic acid co-solvent mixture within the hydrogel porous network.

In an embodiment, the solvent mixture within the hydrogel is left to evaporate to generate dried materials, such as thin films, microstructured/nanostructured thin films or microbeads. In a further embodiment, one or more co-solvent(s) in the solvent system is a volatile solvent. In a preferred embodiment, the first co-solvent is a volatile organic acid, such as acetic acid. In a preferred embodiment, the second or further co-solvent(s) is a volatile alcohol, such as ethanol. In a yet further preferred embodiment, both the first co-solvent and second or further co-solvent(s) are volatile solvents.

In an embodiment, the materials of the present invention can incorporate one or more plasticizers. Possible plasticizers include ethylene glycol, diethylene glycol, triethylene glycol, tetraethylene glycol, polyethylene glycol, propylene glycol, sorbitol, mannitol, xylitol, fatty acids, glucose, mannose, fructose, sucrose, ethanolamine, urea, triethanolamine; vegetable oils, lecithin, waxes and amino acids.

The amount of plasticizer to be incorporated will depend on the use of the material, for example a film. In an embodiment, the composition may comprise about 1% plasticiser, about 2%, about 5%, about 10%, about 20%, about 30%, about 40%, about 50%, about 60% or more. In a further embodiment, the hydrogel may comprise between about 5-50% plasticiser, about 10-50%, about 20-40% about 15-35% or about 20% plasticizer.

Adding a plasticizer can influence the mechanical properties of the material. Typically, adding a plasticiser will increase the elasticity of the material but this typically conversely reduces the strength of the resultant material.

The hydrogels of the present invention allow for the formation of a range of useful plant based biomaterials. Using plant based materials has a number of advantages over previously used animal or petrochemical sources. Firstly, plant sources are renewable and can be efficiently obtained in an environmentally efficient manner. Secondly, plant sources are biodegradable and are therefore an environmentally sound alternative to other plastics. Thirdly, in contrast to animal derived proteins, plant based proteins have the significant advantage that they do not introduce animal derived proteins into a human. This has positive impacts both from a pharmacological and pharmaceutical perspective where animal sourced material must undergo stringent checks and processes to ensure no adverse elements are present (for example removing prions and the like); but also because the products are suitable for vegetarian/vegans.

Since plant based proteins are naturally present in a human (or other animal)'s diet, biomaterials made according to the present invention exhibit a higher degree of digestibility compared to other biopolymers such as polysaccharides (for example, alginates or chitosan). This makes them particularly suitable for pharmaceutical, food and/or cosmetic use.

In an embodiment, the hydrogels of the present invention can be used to form films, for example thin films. Plant protein derived films have many applications including forming biodegradable flexible films for food packaging applications or for use with medical devices including implantable devices.

An advantage of the plant-based materials of the present invention over animal-based materials (or starch-based/cellulose materials), is their inherent insolubility in water. Most biopolymer films would readily dissolve in water, thus making them unusable for food packaging applications on their own, necessitating an extra coating layer with a synthetic polymer. These issues are overcome with the present invention.

Films may have a typical thinness of 1-1000 µm, 1-100 µm, 10-100 µm, 20-60 µm, 30-50 µm and the like.

Films may have a Young's modulus over 20 MPa, over 50 MPa, over 80 MPa, over 100 MPa, over 200 MPa, over 300 MPa, over 400 MPa, over 500 MPa, over 600 MPa or more.

Films may have an elongation break percentage of above 10%, above 20%, above 30%, above 40%, above 50%, above 60%, above 70%, above 80%, above 90%, above 100% or more.

The Young's modulus/elongation break percentage figures describe films made using plant based functional materials. Said properties may be replicated in all structured materials as described herein using said materials.

Films can be micropatterned with features ranging from 100 nm to 1000 µm, enabling novel functional properties such as: superhydrophobicity (lotus-leaf effect) or structural colour (attributed to Mie scattering).

Functional composite films can be produced by embedding inorganic nanoparticles, such as gold nanoparticles or silver nanoparticles, for the generation of flexible electronics or films with antibacterial properties, respectively.

In a further embodiment, the hydrogels of the present invention can be used to form microbeads. Forming microbeads from a plant-based source overcomes the environmental issues with current plastic based microbeads. Microbeads are typically solid particles with a diameter of less than one millimetre in their largest dimension.

In an embodiment, the microbeads according to the present invention have a size of less than 1 mm in the largest dimension, less than 900 µm, less than 800 µm, less than 700 µm, less than 600 µm, less than 500 µm, less than 400 µm, less than 300 µm, less than 200 µm, or less than 100 µm.

In a further embodiment, the hydrogels of the present invention can be used to form microcapsules. Microcapsules can be used to encapsulate a variety of substances and find various industrial applications, including in cosmetics, food use, household product use, agrochemical use and pharmaceutical use.

Microcapsules made according to the present invention provide a completely biodegradable alternative to standard synthetic polymers microencapsulation shell materials.

Microcapsules made according to the present invention uniquely enable plant-based materials to assemble microfluidically.

Microcapsules made according to the present invention provide, for example, excellent stability against adverse storage conditions, and become a safer food- or pharmaceutical-grade solution to preserve active ingredients, for example vitamins, essential fatty acids or antioxidants in food use or pharmaceutical active agents including both small and large molecules.

Microcapsules made according to the present invention also may have the advantage that they can be generated using microfluidic technologies, ensuring high reproducibility, the ability to generate complex structures (core-shell) and/or can be made using mild-processing conditions thereby protecting the active agent they encapsulate.

Robust microcapsules may also be generated from plant-based proteins by controlling the self-assembly of protein aggregates in the absence of cross-linkers or any other hazardous substances.

In an embodiment, microcapsules according to the present invention may encapsulate a hydrophobic inner composition. In a further embodiment, microcapsules according to the present invention may encapsulate a hydrophilic inner composition. In a further embodiment, microcapsules according to the present invention may encapsulate a live organism composition. In a further embodiment, microcapsules according to the present invention may encapsulate a powdered composition. In a yet further embodiment, microcapsules according to the present invention may encapsulate an oil-in-water, water-in-oil, oil-in water-in oil, or water-in-oil-in water emulsion and the like.

The plant-based hydrogels according to the present invention can form the microcapsule shell. In an embodiment, the shell may have a thickness of about 100 nm, 200 nm, 300 nm, 400 nm, 500 nm, 600 nm, 700 nm, 800 nm, 900 nm, 1 µm, 2 µm, 3 µm, 4 µm, 5 µm, 6 µm, 7 µm, 8 µm, 9 µm, 10 µm, 11 µm, 12 µm, 13 µm, 14 µm, 15 µm, 16 µm, 17 µm, 18 µm, 19 µm, 20 µm, 25 µm, 30 µm, 30 µm, 35 µm, 40 µm, or 50 µm and the like. Further thicknesses include between 10 nm-50000 µm, between 10 µm-100 µm, between 10 µm-50 µm, between 1 µm-10 µm and the like.

Plant based microcapsules according to the present invention may encapsulate any nutraceutical, cosmetic, pharmaceutical or agrochemical suitable active agent including vitamins, essential fatty acids, antioxidants, small molecules, hydrophilic small molecules, hydrophobic small molecules, proteins, antibodies, antibody-drug conjugates, fragrances and other large molecules.

Suitable encapsulated agents include one or more agents selected from:
cross-linkers, hardeners, organic catalysts and metal-based catalysts (for example organo-complexes and inorgano-complexes of platinum, palladium, titanium, molybdenum, copper, or zinc) for polymerization of elastomer formulations, rubber formulations, paint formulations, coating formulations, adhesive formulations, or sealant formulations;
dyes, colorants, pigments for inks, personal care products, elastomer formulations, rubber formulations, paint formulations, coating formulations, adhesive formulations, sealant formulations, or paper formulations;
fragrances for detergents, housecleaning products, personal care products, textiles (so-called smart textiles), coating formulations. Fragrances useful to the invention are any of the compounds belonging to the list of standards published and updated by the International Fragrance Association (IFRA);
aromas, flavors, vitamins, aminoacids, proteins, essential lipids, probiotics, antioxidants, preservatives for feed and food products;
fabric softeners and conditioners for detergents and personal care products;
bioactive compounds such as enzymes, vitamins, proteins, vegetable extracts, moisturizers, sanitizers, antibacterial agents, sunscreen agents, drugs, for personal care products, textiles (so-called smart textiles). These compounds include but are not limited to vitamin A, vitamin B, vitamin C, vitamin D, vitamin E, para aminobenzoic acid, alpha hydroxyacid, camphor, ceramides, ellagic acid, glycerin, glycin, glycolic acid, hyaluronic acid, hydroquinone, isopropyl, isostearate, isopropyl palmitate, oxybenzone, panthenol, proline, retinol, retinyl palmitate, salicylic acid, sorbic acid, sorbitol, triclosan, tyrosine; and
fertilizers, herbicides, insecticides, pesticides, fungicides, repellants, and disinfectants for agrochemicals.

Plant based microcapsules according to the present invention may also be useful in diagnostics and high-throughput screening.

Plant based hydrogels according to the present invention may also be useful in manufacturing microgels or microscale-sponges. Microgels are micro scale hydrogels. Microscale-sponges may be considered to be microgels which are loaded with a substance, for example an active or ingredient.

Plant based hydrogels according to the present invention may also be useful in manufacturing bio-scaffolds and bio-supports. Such materials may be useful both in-vitro and in-vivo to grow cells and tissue. The hydrogels may also be useful in coating medical devices and implants.

The plant-based proteins according to the present invention may be functionalised and/or derivatised to change the properties of the protein.

The invention will now be described with reference to the following non-limiting examples.

Materials
    Soy protein isolate (SPI) (92% protein) was purchased from MP Biomedicals.
    Pea Protein Isolate (PPI) (80% protein) was purchased from Cambridge Commodities Ltd.
    Acetic acid (Glacial) and lactic acid (Natural, ≥85%), soybean oil (Soya oil from *Glycine max*), (-)-Riboflavin, glycerol and PFO (1H,1H,2H,2H-Perfluoro-1-octanol) were purchased from Sigma Aldrich. Pectin was kindly provided by Cargill.
    Fluorinert (FC-40) was purchased from Fluorochem.
    008-FluoroSurfactant was purchased from RAN Biotechnologies.

Example 1

Self-standing hydrogels were prepared according to the following process.

Glacial acetic acid was mixed with deionised water at different ratios (10% v/v, 30% v/v, 50% v/v, 70% v/v and 90% v/v). Soy protein isolate was added to the DI water/acetic acid solution at a final protein concentration of 100 mg/ml. A dispersion of non-soluble protein was obtained. For solubilisation of the protein, the mixture was exposed to ultrasonication for 30 min (High-Frequency Power Output=70 W, Frequency=20 KHz, Amplitude=90%). During this process, the sample temperature was kept at 85° C.-90° C. After 30 min, a completely translucent liquid solution was obtained. The sample was left to cool down at room temperature for 5 min. During this process, the liquid sample turns into a translucent and self-standing hydrogel observable after vial inversion.

Hydrogels made according to Example 1 for the varying acetic acid/DI water ratios are shown in FIG. 1.

Self-standing hydrogels were seen with 10%-70% v/v acetic acid/DI water ratios. It was noted that for solutions of 30% v/v and higher, a completely translucent solution was produced which rapidly formed a self-standing hydrogel. The fact that the gel was completely translucent suggested it was comprised of small soluble aggregate structures rather than large insoluble aggregates, such as the ones normally found in protein cold-set gels. The hydrogels made according to the invention were stable and retained their structure after multiple washing steps in both water and ethanol.

Scanning Electron Microscopy

Figure 2:
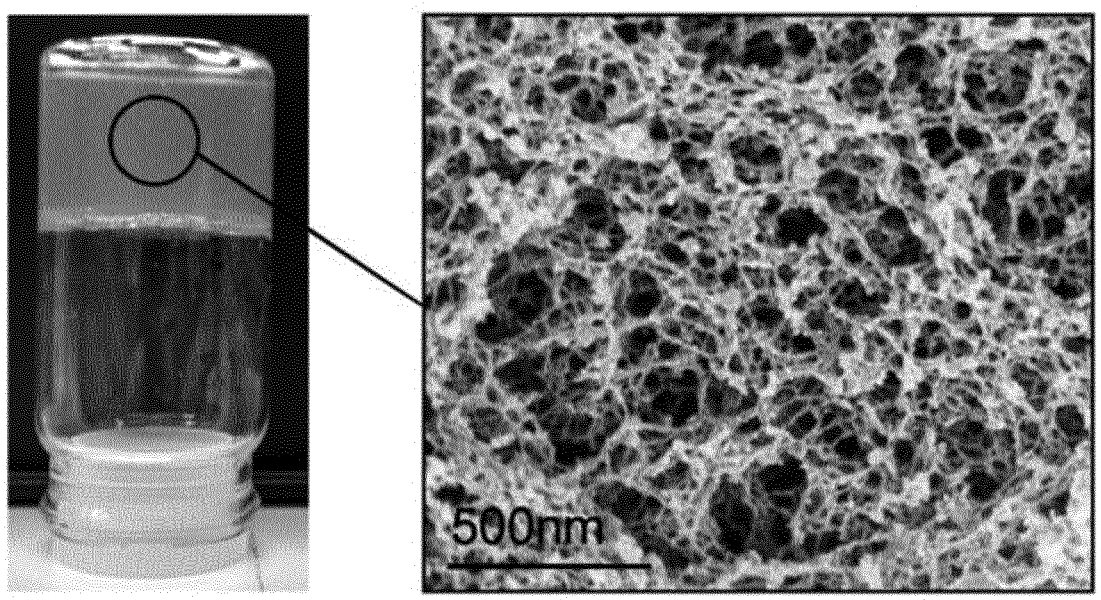
FIG. 2 shows a SEM (Scanning electron microscopy) image of a hydrogel produced using a 30% v/v co-solvent ratio.

SEM (Scanning electron microscopy) was carried out on the hydrogel made using a 30% v/v co-solvent ratio and is shown in FIG. 2. The hydrogel microstructure confirmed the presence of a densely packed network of fine-stranded protein aggregates. The figure also shows that the gel network remains intact after removal of acetic acid.

A plant-based thermoreversible gel has therefore been prepared for the first time.

Soy protein hydrogels and microgels were dehydrated in ethanol using 100% dry ethanol at the last step. Samples were transferred to microporous specimen capsules (78 μm pore size, Agar Scientific) soaked and part-filled with 100% dry ethanol to prevent the sample from drying during transfer. Then, samples were critically point dried using a Quorum E3100 critical point dryer using 4-5 flushes with liquid CO2 and at least 15 min incubation between each flush. Samples were mounted on aluminium SEM stubs using conductive carbon sticky pads (Agar Scientific) and coated with 15 nm iridium using a Quorum K575X sputter coater. Samples were viewed using a FEI Verios 460 scanning electron microscope run at 2 keV and 25-50 pA probe current. Secondary electron images were acquired using either an Everhard-Thornley detector in field-free mode (low resolution) or a Through-Lens detector in full immersion mode (high resolution).

Particle Size Analysis

In order to characterize the size of SPI aggregates, SPI dispersions were prepared in various solvent systems: a) deionised water, b) deionised water adjusted to pH=10 with NaOH, c) deionised water adjusted to pH=2 with HCl and d) 30% (v/v) acetic acid aqueous solution) and treated with three different methods: (1) non-treated, (2) heated for 30 minutes at 95° C. in a water bath, or (3) sonicated for 30 minutes at 95° C. Particle size (hydrodynamic diameter) was measured using Zetasizer Nano (Malvern). All samples were diluted to 0.1% (v/v) immediately after the sonication treatment and the measurements were performed subsequently.

Figure 3:
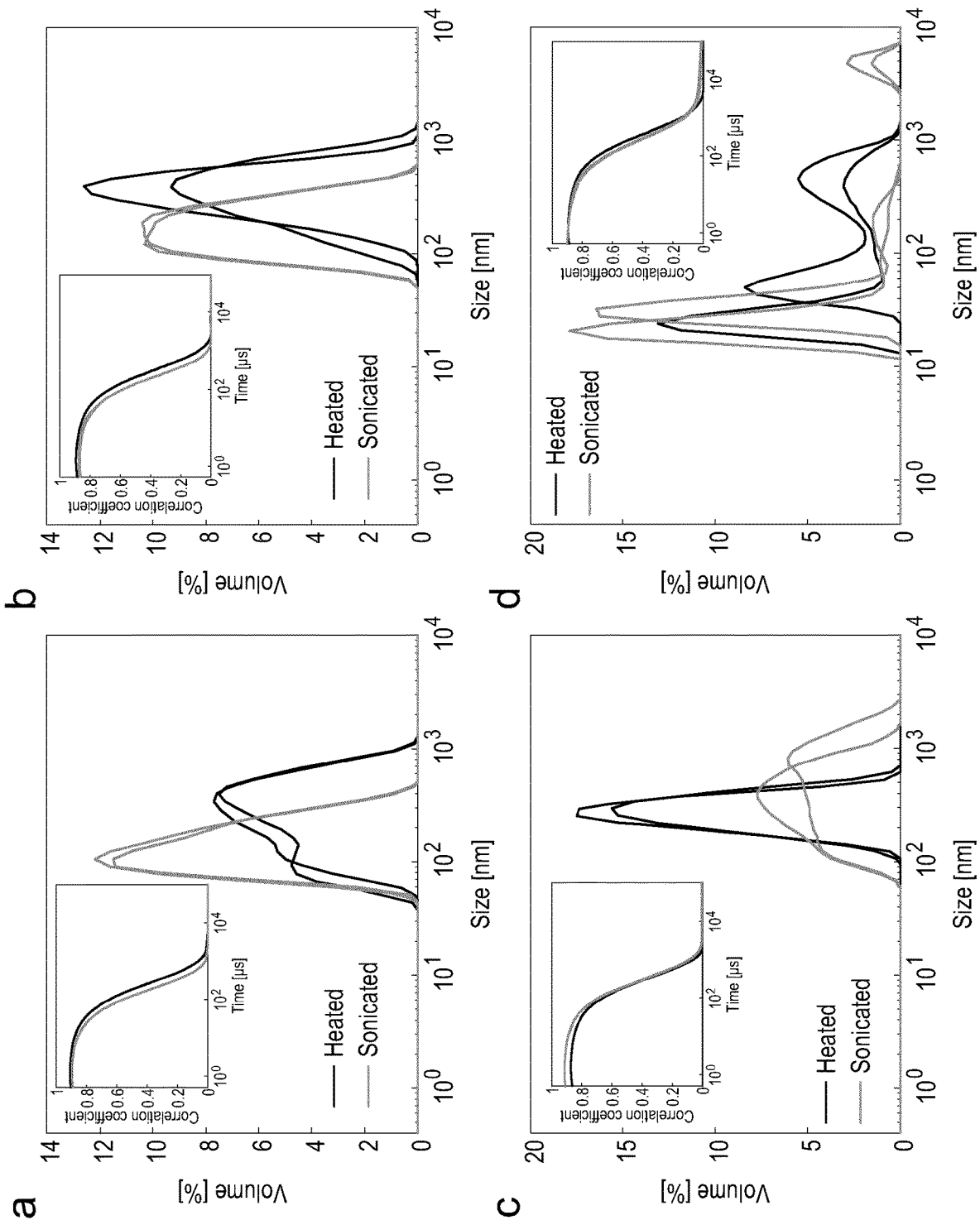
FIG. 3 shows the estimated size distributions of the SPI particles through dynamic light scattering (DLS) for SPI dispersions in water (a), in pH10 NaOH (b), in pH2 HCl (c) and in 30% acetic acid (d). For each solvent, samples were prepared through either heating at 95 C for 30 minutes (noted as heated) or sonicating for 30 minutes (noted as sonicated). All measurements were performed at 0.1% protein concentration and repeated two times. Inset shows the raw correlogram for each condition.

Dynamic light scattering (DLS) analysis (FIG. 3) revealed that the protein aggregates prepared in a 30% (v/v) acetic acid solution sonicated for 30 minutes at 95° C. have significantly smaller particle size (29±9.1 nm) compared to those not solubilized prepared under different conditions.

Rheological Characterisation

For characterisation of the rheological properties of SPI hydrogels, the samples produced via Example 1 were left to cool down at RT for 1 h, and then kept at 4° C. for 12 h.

Rheological measurements were performed using an ARES controlled strain rheometer. Tests were carried out using 25 mm smooth parallel plates at a temperature of 20° C. The strain and frequency sweeps were carried out on SPI hydrogel samples containing increasing amounts of acetic acid. The strain sweeps were carried out using a frequency of 10 rad/s from 0.01 to 100% strain. The frequency sweeps were carried out using a strain of 1% (within the linear viscoelastic region) from 0.1 to 100 rad/s. All rheological measurements were performed under temperature control (20±0.25° C.).

Figure 4A:
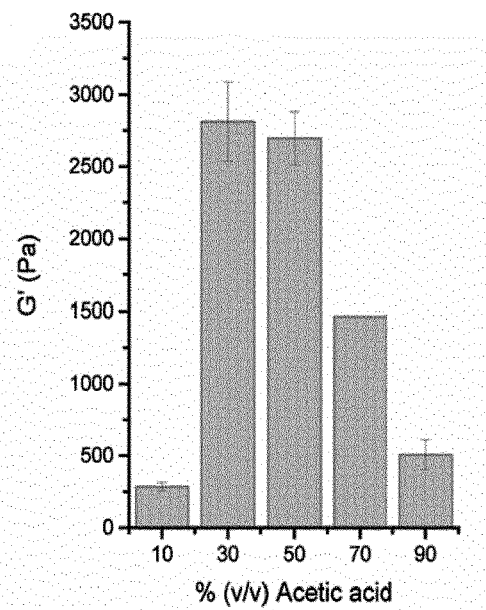
FIG. 4a shows the rheological properties of SPI hydrogels as a function of H2O:Acetic acid co-solvent ratios.
Figure 4B:
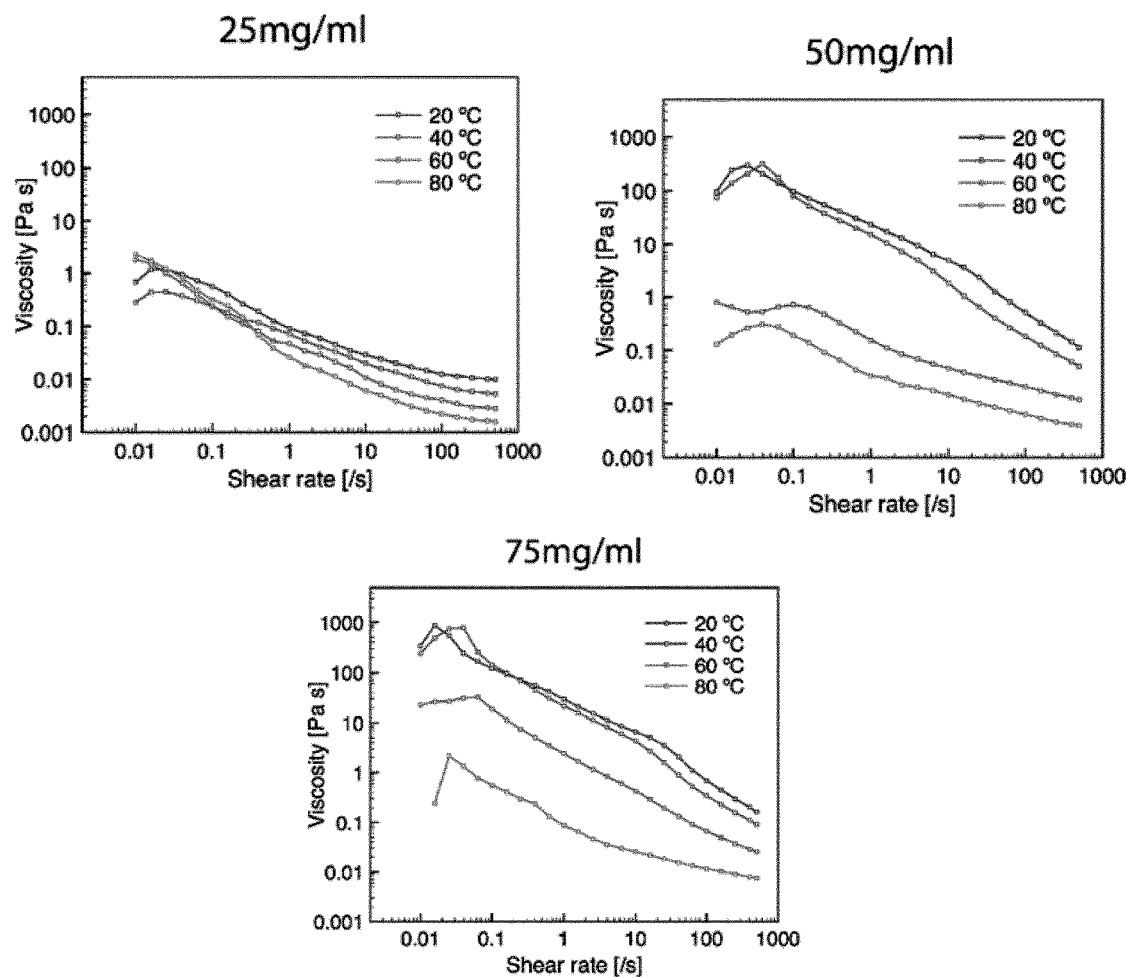
FIG. 4b shows the shear thinning behaviour of SPI hydrogels prepared at different concentrations.

The rheological properties of SPI hydrogels as a function of H2O:Acetic acid co-solvent ratios are shown in FIG. 4*a*. It can be seen that the addition of low amounts of acetic acid (10% v/v) result in the formation of weak hydrogels, which could be attributed to the incomplete solubilisation of protein and the presence of larger insoluble aggregates. On the other hand, large amounts of acetic acid also resulted in the formation of weak hydrogels (90% v/v). Hydrogels formed with co-solvent ratio of 30-70% v/v resulted in stronger hydrogels with hydrogels prepared with 30 and 50% acetic acid (v/v) showing a G' larger than 2500 Pa.

Figure 4C:
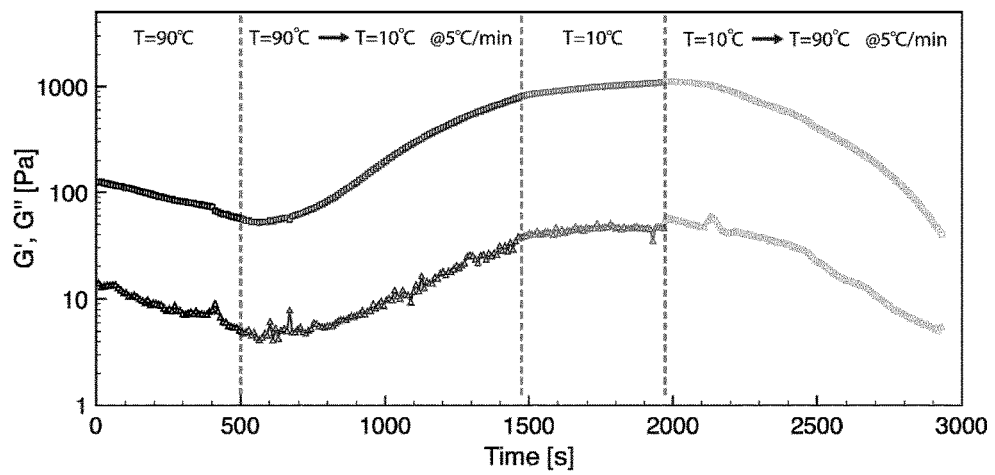
FIG. 4c shows the thermoreversible rheological behaviour of SPI hydrogels at different temperatures.

For the determination of the thermoreversible gelling properties of a SPI hydrogel (75 mg/ml SPI dispersed in 30% v/v acetic acid aqueous solution) rheological measurements were performed using a Discovery HR-2 (TA Instruments) rheometer. Tests were carried out using 20 mm smooth parallel plates. The tests were carried out on a SPI hydrogel sample at different temperatures using an angular frequency of 10 rad/s. Initially, a sonicated SPI solution was loaded into a pre-heated rheometer probe at 90° C. After 500 seconds, the temperature was lowered to 10° C. at a rate of 5° C./min. Once the temperature of the sample reached 10° C., it was maintained at 10° C. for 500 sec. Finally, the sample was heated to 90° C. at a rate of 5° C./min. The results for the thermoreversible rheological properties of SPI hydrogels are shown in FIG. 4*c*.

This shows the unique manufacturing capabilities of the materials of the present invention since the gel thermoreversibily moved fully between gel and liquid state. Such thermoreversibility has not previously been seen.

FTIR

Changes in hydrogel secondary structure under different solvent ratios were investigated. Structural analysis of the SPI hydrogels was performed by using an FTIR-Equinox 55 spectrometer (Bruker). The hydrogel samples were used without further pre-treatment and were loaded into the FTIR holder and analysed by subtracting a 50% v/v (DI water/acetic acid) reference. The atmospheric compensation spectrum were subtracted from the original FTIR spectra and a secondary derivative was applied for further analysis. Each FTIR measurement was repeated 3 times for every sample replicate (in average 9 replicates per sample). The sensitivity of the instrument was detected to be 5%. To resolve the transformation of native structure of Soy Protein Isolate into supramolecular aggregates, vibrational changes in amide I, which is strictly correlated with protein secondary structure was followed.

Figure 5A:
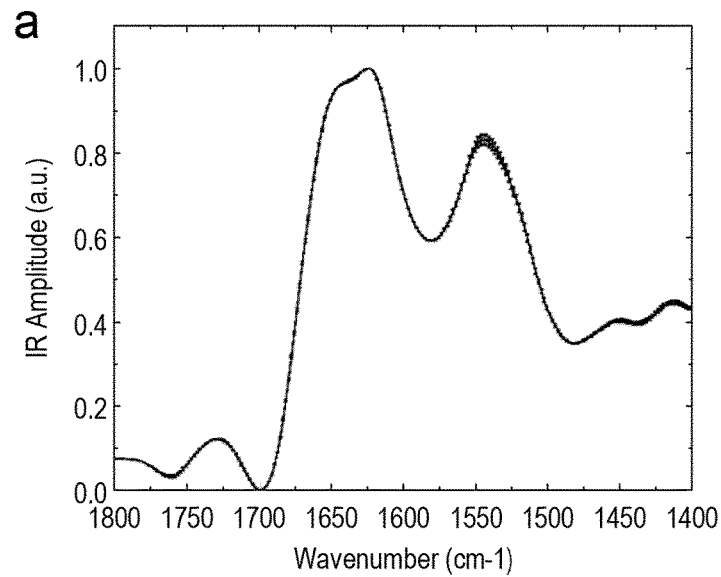
FIGS. 5a and 5b show structural changes of SPI hydrogel secondary structure under different H2O:Acetic acid co-solvent ratios, calculated from the amide I bands in the FTIR spectra.
Figure 5A:
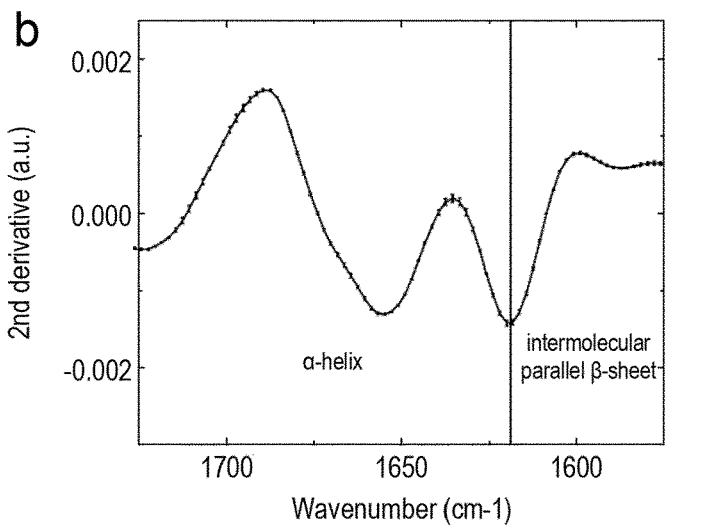

The results of the FTIR measurements is shown in FIG. 5a. It is clear from the $2^{nd}$ derivative analysis that SPI hydrogels have a high content of α-helix (1656 cm$^{-1}$) and intermolecular parallel β-sheet (1625 cm$^{-1}$) secondary structure.

Figure 5B:
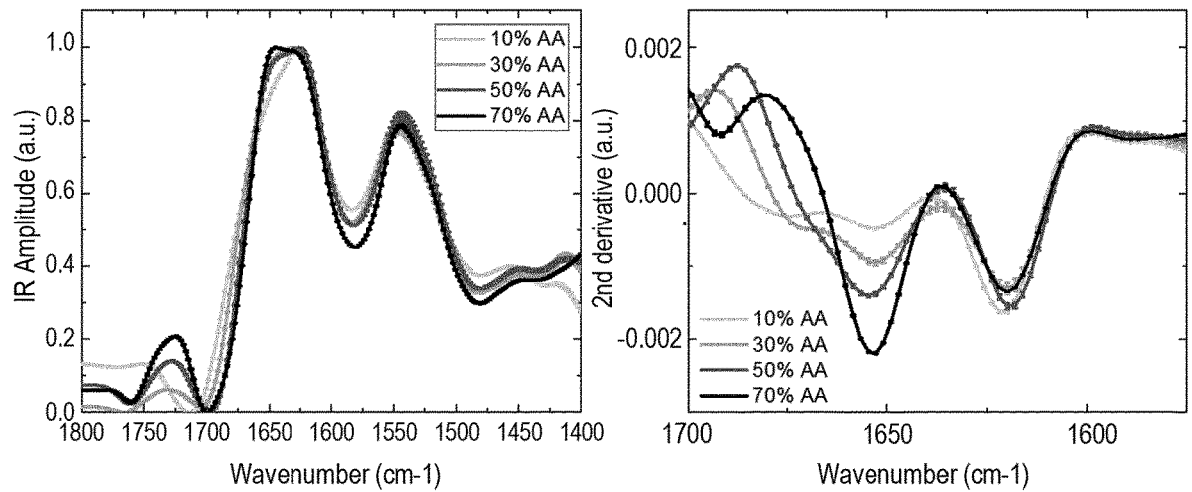

The FTIR measurements of SPI hydrogel samples prepared using different solvent ratios shown in FIG. 5b reveal that using increasing amounts of acetic acid causes an increase of α-helical structure (1654 cm-1) against the content of intermolecular antiparallel and parallel β-sheet (1620 cm-1).

Figure 5C:
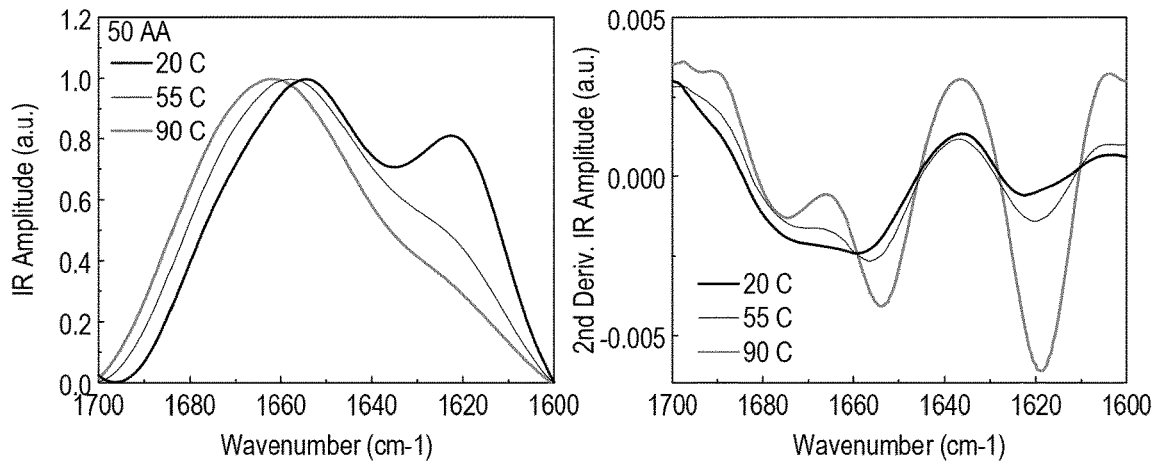
FIG. 5c shows structural changes of SPI hydrogel secondary structure under different temperatures, calculated from the amide I bands in the FTIR.

Changes in hydrogel secondary structure at different temperatures was also investigated. FTIR measurements of a SPI hydrogel sample (SPI 100 mg/ml dispersed in 30% v/v acetic acid) were performed by incubating the sample at different temperatures in the FTIR sample holder (90° C., 55° C. and 20° C.). It can be clearly observed in FIG. 5c that upon heating the sample at 90° C., the amount of intermolecular parallel β-sheet structure is decreased, whilst upon cooling the sample to 20° C., the content parallel β-sheet is greatly increased.

This is evidenced by the thermoreversibility of the present invention, correlating this advantageous property to the protein secondary structure.

Example 2

Hydrogels were prepared using lactic acid as a co-solvent according to the following process.

Lactic acid was mixed with deionised water at different ratios (10% v/v, 30% v/v, 50% v/v, 70% v/v and 90% v/v). Soy protein isolate was added to the DI water/lactic acid solution at a final protein concentration of 100 mg/ml. A dispersion of non-soluble protein was obtained. For solubilisation of the protein, the mixture was exposed to ultrasonication for 30 min (High-Frequency Power Output=70 W, Frequency=20 KHz, Amplitude=90%). During this process, the sample temperature was kept at 85° C.-90° C. After 30 min, a completely translucent liquid solution was obtained. The sample was left to cool down at room temperature for 5 min.

Gel Electrophoresis

Analysis of the different hydrolysed protein fragments at different water:lactic acid ratios (from 0 to 90% v/v) was performed by sodium dodecyl sulfate-polyacrylamide gel electrophoresis (SDS-PAGE) using NuPAGE 4-12% gels with MES buffer.

Figure 6:
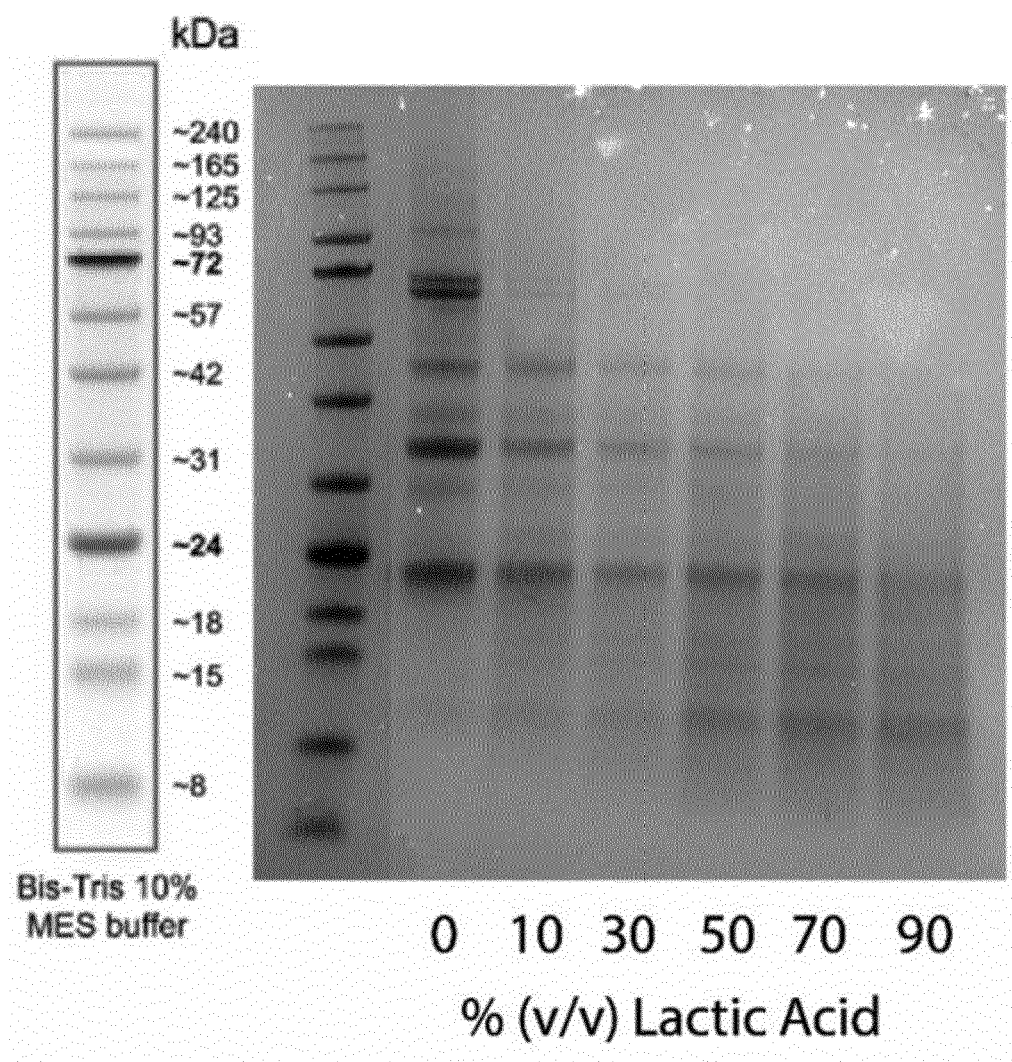
FIG. 6 shows an SDS-PAGE electrophoretogram showing increasing degree of protein hydrolysis upon increasing amount of acetic acid.

The results are shown in FIG. 6 and it can be seen that increasing amounts of lactic acid led to a higher degree of protein hydrolysis.

Having established that stable hydrogels can be formed using the methods of the present invention, the use of such hydrogels were employed in microfluidic approaches to form discrete and uniform microscopic objects, such as microgels and microcapsules.

Example 3—Microgel Fabrication

Microfluidic devices (droplet generator) were fabricated using standard soft lithography techniques with a negative master photoresist (SU8 3050). The continuous oil phase (2% 008-FluoroSurfactant in Fluorinert FC-40) was loaded in a 2 ml tube, whilst the dispersed liquid SPI phase (85 mg/ml SPI in 40% v/v acetic acid, kept at 85° C.) was loaded in a 1.5 ml tube and rapidly placed on a heating block at 85° C. In order to prevent the gelation of the SPI solution during the transport into the microfluidic device, a custom-made silicone heater (Holroyd Components), comprising a 1/32" ID stainless steel tubing was used to maintain the temperature of the PTFE tubing connecting the SPI reservoir and the inlet in the microfluidic device. The silicon heater temperature was controlled by a custom-built temperature controller. Droplets of ~100 μm diameter were generated by pumping both solutions into a standard flow-focusing droplet generator by a pressure-driven system (Elveflow OB1). Different pressure rates were tested until achieving a uniform and continuous generation of a monodisperse population of microdroplets. Final pressure rates were 175 mbar for the dispersed aqueous phase and 200 mbar for the continuous oil phase. The generated droplets were collected in a 1 ml pipette tip, and were kept at room temperature for 12 h to ensure the gelation process was complete. The formed microgels were then washed by a standard de-emulsification procedure: the continuous oil phase containing fluorosurfactant was first removed from the vial. For 500 μl of microgels, an equal volume of 10% PFO solution in Fluorinert FC-40 was added and thoroughly mixed for 30 seconds. The 10% PFO solution in Fluorinert FC-40 was then removed and two subsequent oil washes were performed by adding an equal volume of pure Fluorinert FC-40. Finally, 500μ of deionised water were added to the vial, resulting in the transfer of the microgels from the oil to the aqueous phase. The supernatant containing the microgel suspension was transferred to a separate vial. A subsequent series of washing steps were performed to remove acetic acid from the microgel suspension by adding 500 μl of deionised water adjusted to pH=2 with HCl to the microgel suspension, followed by centrifugation at 1000 rpm for 1 min. The supernatant was removed and the microgels were re-suspended by adding 500 μl of deionised water adjusted to pH=2 with HCl. A total of 3 washing steps were performed to remove acetic acid from the microgel suspension. Mechanically stable microgels suspended in deionised water (pH=2) were obtained after the final washing step. In order to prepare the microgel samples for SEM analysis, the microgels were washed with 100% ethanol in a 3 step procedure: the microgels were first suspended in a 25% v/v ethanol-aqueous solution and left under constant agitation (100 rpm) for 3 h. After centrifugation and removal of the supernatant, the microgels were then re-suspended in a 50% v/v ethanol-aqueous solution and left under constant agitation (100 rpm) for 3 h. Finally, after centrifugation and removal of the supernatant, the microgels were then re-suspended in a 100% v/v ethanol-aqueous solution and left under constant agitation (100 rpm) for 12 h.

Figure 7:
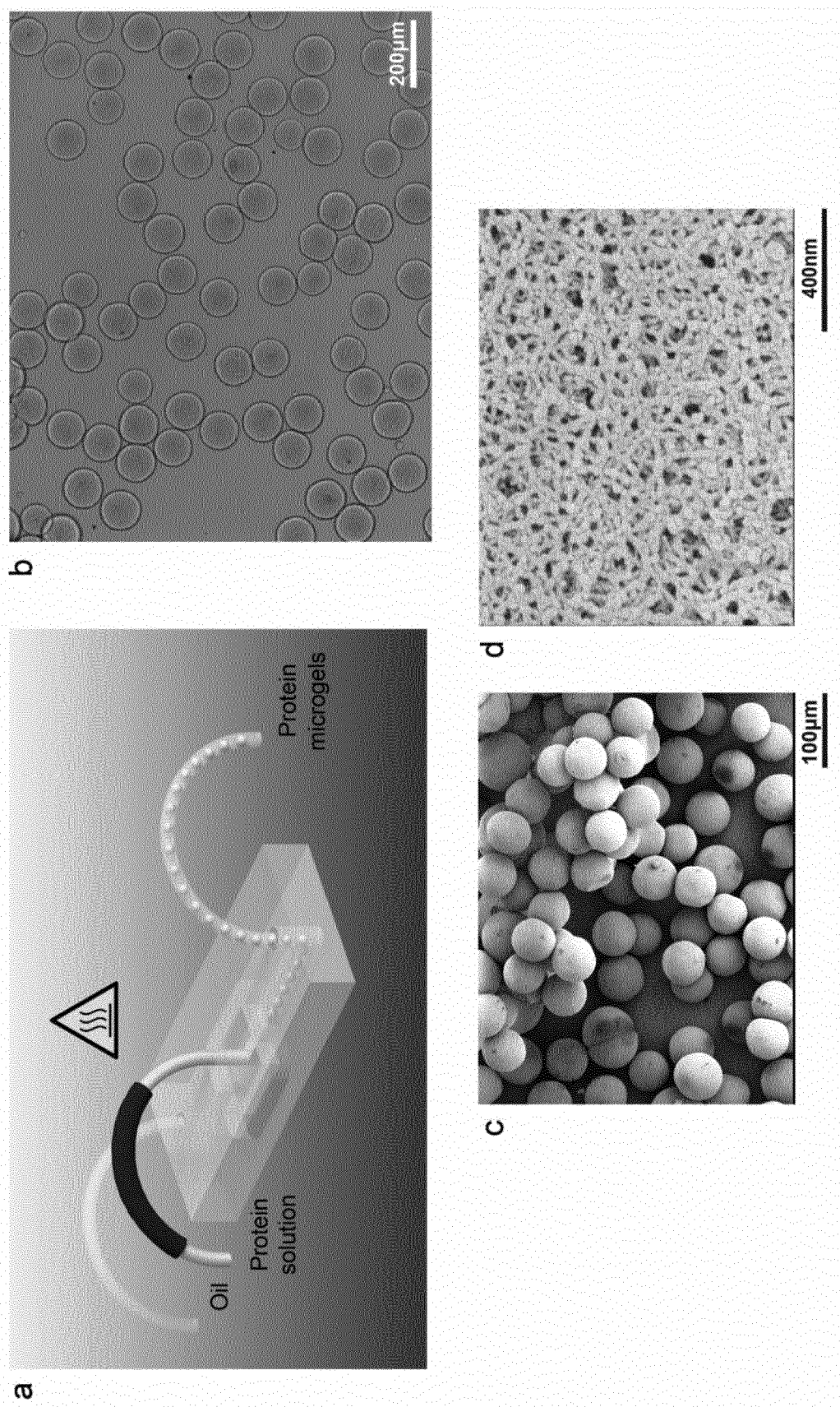
FIG. 7 shows microbeads formed using hydrogels of the present invention. 6a shows a schematic representation of microbead formation; 6b shows stable microbeads suspended in aqueous solution (pH=2); 6c shows SEM image of microbeads prepared by super-critical point drying; and 6d shows SEM image of the gel network on the surface of a microbead.

The results of this experiment are shown in FIG. 7. FIG. 7a shows a schematic representation of microbead formation. FIG. 6b shows stable microgels suspended in aqueous solution (pH=2). FIG. 7d shows SEM image of microbeads prepared by super-critical point drying. FIG. 7e shows SEM image of the gel network on the surface of a microbead.

The resultant microgels were stable in aqueous solution under acidic conditions, as well as in the presence of 100% ethanol. Once self-assembled, the protein aggregates are completely insoluble in solution, hence the stability of the microgels.

These results demonstrate that mechanically robust microgels can be generated from plant-based proteins simply by controlling the self-assembly of protein aggregates at the nanoscale, and in the complete absence of cross-linkers or any hazardous substance.

Example 4—Core-Shell Microcapsule Fabrication

Having established mechanically robust microgels can be generated, use of the hydrogels for microencapsulation was explored.

For the fabrication of a co-axial flow-focusing microfluidic device, a multi-step photolithographic process was followed. The photolithographic process is explained in Tran, T. M., Cater, S. & Abate, A. R. Coaxial flow focusing in poly(dimethylsiloxane) microfluidic devices. *Biomicrofluidics* 8, 1-7 (2014) but is explained briefly below.

Two SU8 photoresist masters were required. In the first master, a 25 µm photoresist layer was fabricated for the inner channel, followed by a 50 µm layer for the medium channel and a 75 µm layer for the outer channel. The second master contained a 25 µm layer for the medium channel and a 50 µm layer for the outer channel. To fabricate the final coaxial flow-focusing device, two different PDMS slabs were peeled off from the masters, and were subsequently aligned and bonded by plasma oxidation. A small amount of sprayed water droplets was placed between the two PDMS slabs after plasma oxidation to allow the alignment of the microfluidic channels. The final aligned PDMS device was baked in the oven at 65° C. overnight to complete the bonding between the two layers.

The microfluidic process to generate core-shell microcapsules was equivalent to the one employed in Example 3 to generate microbeads. However, an additional inlet for the inner phase (core) was added to the system. For the fabrication of core-shell microcapsules containing a lipophilic active, 450 µl of soybean oil were pre-emulsified in 550 µl SPI protein solution (20 mg/ml, 30% v/v acetic acid). The soybean oil-in-water emulsion (inner phase), SPI solution (85 mg/ml, 40% v/v acetic acid, middle phase) and FC-40 (2% v/v 008-Fluorosurfactant, outer phase) were pumped to a coaxial flow focusing microfluidic device by a pressure-driven system (Elveflow OB1). Different pressure rates were tested until achieving a uniform and continuous generation of a monodisperse population of core-shell microcapsules with ~120 µm diameter (Pressure Inner phase (100 mbar), Pressure Middle Phase (150 mbar) and Pressure Outer Phase (100 mbar). The core-shell ratio could be adjusted by simply controlling the relative pressure between the inner and the middle phase. The microcapsules were collected and subsequently washed as described in the previous section.

It can be seen that the inner core materials are kept separate in this example to the shell materials, which is different to a standard microencapsulation matrix approach where the active ingredients are previously mixed with the matrix materials. The reason for this approach was the pH of the starting protein solution being very low due to the high amount of acetic acid initially present, and also the high temperatures required to keep the protein solution in a liquid state. Instead, a 3-D coaxial microfluidic device was used that allowed for easy production of the core-shell structures without compromising the stability of the encapsulated ingredients.

Figure 8A:
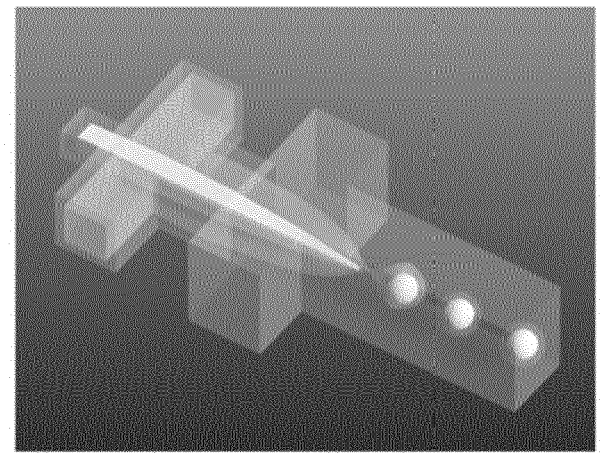
FIG. 8a shows a schematic representation of a multi-layer 3D microfluidic droplet generator used to generate core-shell microcapsules with both a lipophilic and a hydrophilic core
Figure 8B:
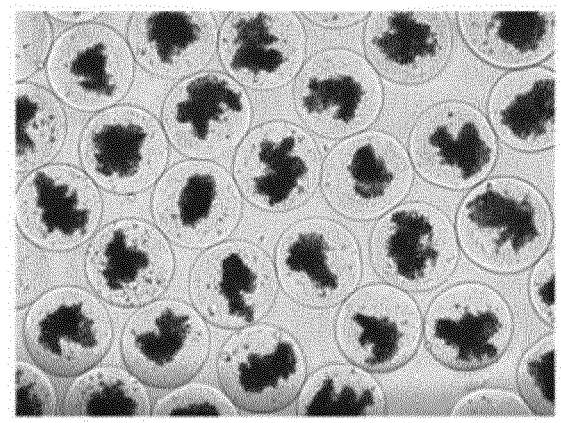
FIG. 8b shows core-shell microcapsules containing a lipophilic core suspended in aqueous solution.

A schematic representation of the microfluidic droplet generator is shown in FIG. 8a, showing a 3D flow-focusing microfluidic device. Core-shell microcapsules produced according to the present invention containing a lipophilic-core suspended in an aqueous solution are shown in FIG. 8b. The microcapsule shell solely comprises self-assembled SPI proteins and the core is an oil-in water microemulsion (lipophilic).

Example 5—Core-Shell Microcapsule Fabrication Encapsulating an Active Agent

The microfluidic process described in Example 4 was repeated to generate a microcapsule comprising a hydrophilic core. The core comprised a 1% (w/w) HMP pectin solution containing a suspension of a soluble active ingredient (Riboflavin).

Figure 9:
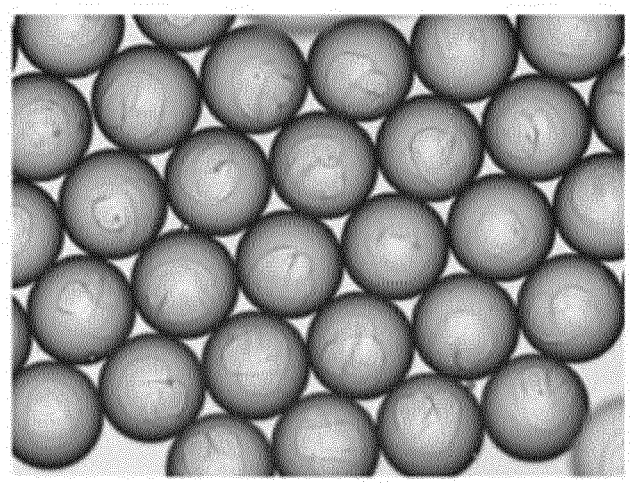
FIG. 9 shows core-shell microcapsules containing a hydrophilic core containing a suspension of a soluble active ingredient (Riboflavin)

Core-shell microcapsules made according to the present invention containing a hydrophilic core suspended in an aqueous solution are shown in FIG. 9. The microcapsule shell solely comprises self-assembled SRI proteins and the core is a hydrophilic suspension of an active agent, in this case riboflavin.

Example 6—Controlled Release Microcapsules

Since the protein shells are solely comprised of protein aggregates, an experiment was carried out to confirm that the release of the cargo can be triggered by the degradation of the protein shell in the presence of digestive enzymes, via a two-stage in vitro digestibility test.

A 1 L stock solution of SGF (simulated gastric fluid) electrolyte solution was prepared by dissolving 0.257 g KCl, 0.061 g KH2PO4, 1.05 g NaHCO$_3$, 1.38 g NaCl, 0.122 g MgCl2(H2O)6, and 0.024 g (NH4)2CO3 in 1 l of deionised water. A 1 l stock solution of SIF (simulated intestinal fluid) electrolyte solution was prepared by dissolving 0.253 g KCl, 0.054 g KH2PO4, 3.57 g NaHCO$_3$, 1.12 g NaCl, 0.335 g MgCl2(H2O)6, 0.44 g CaCl2.2H2O and 0.23 g of bile extract in 1 l of deionised water. 1 ml of SGF was prepared by dissolving 8 mg of pepsin in the SGF electrolyte solution, and the pH was adjusted to pH=2 by adding a small amount of 1M HCl.

50 µl of core-shell microcapsules made according to Example 4 were washed from the oil phase by using the method described in Example 4 (150 µl of deionised water at pH=2 were added). Then, 200 µl of SGF were mixed with the microcapsule suspension, followed by incubation at 37° C. and 300 rpm for 60 min in a Thermo Shaker. For the simulated intestinal phase, 3 mg of pancreatin were dissolved in 1 ml of SIF electrolyte solution. 400 µl of SIF were added to the previous microcapsule in SGF solution. The pH was adjusted to 7 by adding a small amount of 1M NaOH. Microcapsules were then incubated at 37° C. for 120 min.

The results of the experiment are shown in FIG. 10, with FIG. 10a showing the microcapsules in aqueous solution; FIG. 10b showing the microcapsules still intact after 60 minutes in SGF; and FIG. 10c showing release of the microcapsules after 120 minutes in SIF.

The experiment demonstrates that incubation under SGF conditions (8 mg/ml Pepsin, pH=2), triggered a slow degradation of the protein shell without compromising the stability of the lipophilic core, which remained inside the microcapsule. Subsequent incubation in SIF (1.5 mg/ml Pancreatin, pH=7) resulted in a significant degradation of the protein shell and complete release of the lipophilic core. Control experiments in the absence of enzymes but under the same pH conditions indicated that protein shell degradation was primarily triggered by enzymatic digestion.

It can therefore be seen that the microcapsules remained intact under simulated gastric conditions but rapidly disintegrated under simulated intestinal conditions demonstrating that the microcapsules according to the present invention can be used for controlled delivery of nutraceutical or pharmaceutical active ingredients.

Example 7—Controlled Release Microcapsules Including an Active Agent

The experiment of Example 6 was repeated but using microcapsules containing a hydrophilic core containing the active agent riboflavin made according to Example 5.

Riboflavin microcapsules are shown in FIG. 11a (i.e. microcapsules with a hydrophilic core (1% HMP pectin+Riboflavin). FIG. 11b shows the results of a two-stage in vitro digestibility study following by HPLC analysis showing cumulative release of riboflavin under simulated conditions. It can be seen that there is a controlled release of riboflavin under simulated gastric and small intestine conditions, enabled by the encapsulation of the hydrophilic active ingredient within a plant-based protein microcapsule shell. Encapsulation is shown to prevent the rapid diffusion of riboflavin and promotes controlled release.

Example 8—Preparation of Microscale-Sponges

Soy protein microscale-sponges were prepared according to the present invention. The microfluidic process described in Example 2 was repeated to generate soy protein microgels (100 μm in diameter). The microgels were washed with 100% ethanol in a 3 step procedure: the microgels were first suspended in a 25% v/v ethanol-aqueous solution and left under constant agitation (100 rpm) for 1 h. After centrifugation and removal of the supernatant, the microgels were then re-suspended in a 50% v/v ethanol-aqueous solution and left under constant agitation (100 rpm) for 1 h. Finally, after centrifugation and removal of the supernatant, the microgels were then re-suspended in a 100% v/v ethanol-aqueous solution and left under constant agitation (100 rpm) for 1 h. At this point, ethanol should have completely replaced water within the microgel porous network. The microgel suspension was centrifuged (1000 rpm, 1 min) and the ethanol supernatant was removed. Then, 250 μl of geranium oil (Natural) were added to the microgels. The microgels were suspended in the oil solution by gently shaking the Eppendorf vial. At this stage, the ethanol-miscible oil phase permeated the microgel porous network. After addition of 500 μl of deionised water to the oil-microgel suspension, oil-loaded SPI microscale-sponges were then transferred into the aqueous phase. The remaining oil phase was removed from the Eppendorf tube.

FIG. 12a shows a distribution of fragrance-oil loaded plant-based protein microscale-sponges. FIG. 12b shows a single fragrance-loaded plant-based protein microscale-sponge at higher magnification (20×), where the protein microgel shell can be easily observed.

By using this approach, water immiscible solvents can be loaded into plant-based protein microscale-sponges, such as fragrance oils. This method enables high-loading efficiencies without the need of using complex microcapsule generation approaches, such as core-shell architectures.

Example 9—Preparation of Films

Soy protein films were prepared according to the present invention. 500 mg of Soy protein isolate) was dissolved into 5 mL of 30% (v/v) acetic acid (100 mg/ml protein concentration). The solution was then exposed to ultrasonication (High-Frequency Power Output=70 W, Frequency=20 KHz, Amplitude=90%). for 30 min. A few minutes before the ultrasonication process was finished, 125 mg of glycerol was added to the SPI solution, and was mixed with the remaining time of the ultrasonication step. Immediately after the ultrasonication step, the solution was cast into a glass petri dish to form a hydrogel (2 mm thickness). The glass petri dish was heated around 100 C to avoid any gelling during the casting process. The glass dish was then removed from the heating plate and air-dried overnight. After drying, the thin film was removed from the glass petri dish and stored in a 50% humidity chamber until further use. The bottom surface of the glass petri dish was coated with Teflon sheet so that the films could be peeled off easily.

A schematic representation of the process according to Example 9 together with the resultant films is shown in FIG. 13. It can be seen that mechanically robust transparent thin films are generated.

Tensile Properties

The tensile properties of the thin films generated in Example 9 were tested as a function of the amount of plasticizer added. Films were manufactured using 10%, 20%, 30%, 40% and 50% (w/w) glycerol.

Tensile properties of the film were tested using a Tinius Olson 5 kN with 10 N load cell. The film was cut into slips with 5 mm width and both ends of the films were glued with a paper holder which has a gap length of 1 mm. The holder and film were mounted to the mechanical testing machine and then the paper folder was cut prior to the measurement to make sure the loading is applied only to the film. The measurement was performed at the speed of 2 mm/min. The film thickness was measured for individual samples using digital calliper. Typical film thickness was 30-50 μm.

Figure 14A:
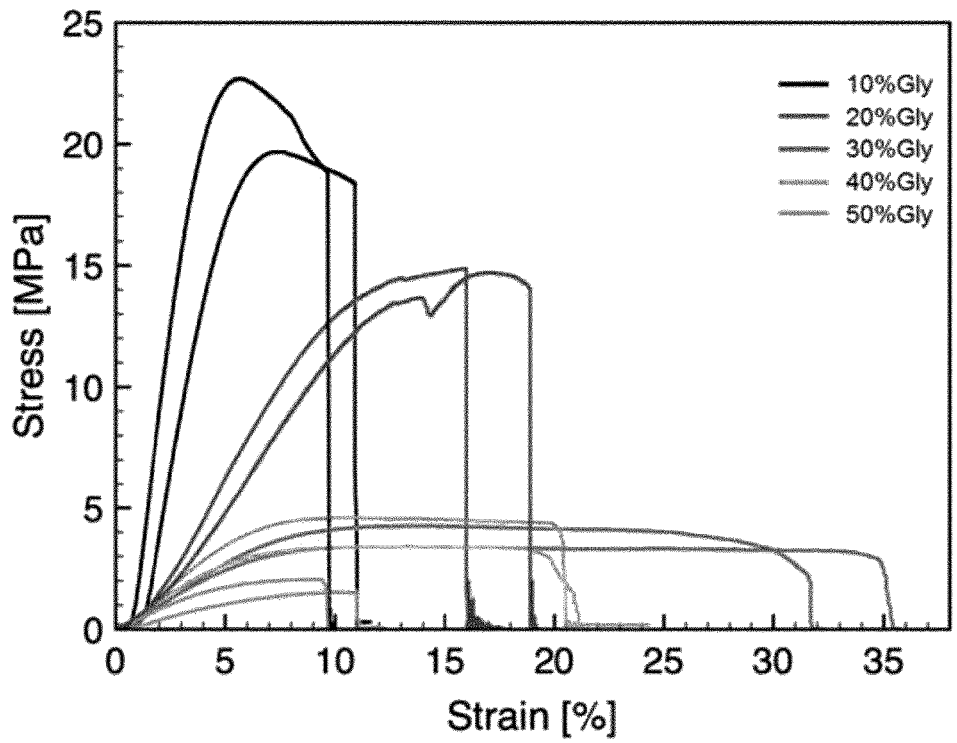
FIG. 14*a* shows stress-strain curves for films made according to the present invention.
Figure 14B:
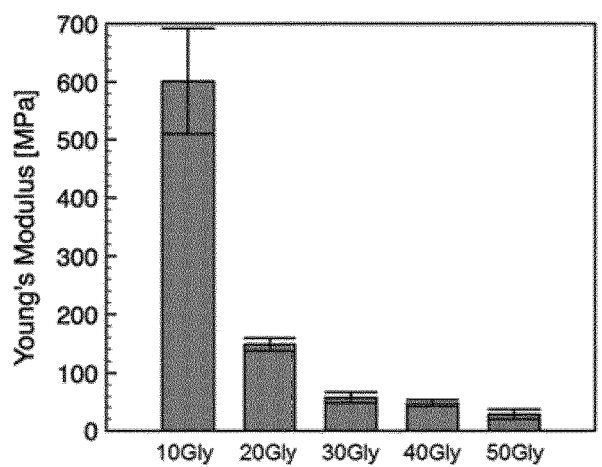
FIG. 14*b* shows Young's Modulus and FIG. 14*c* shows elongation break %.
Figure 14C:
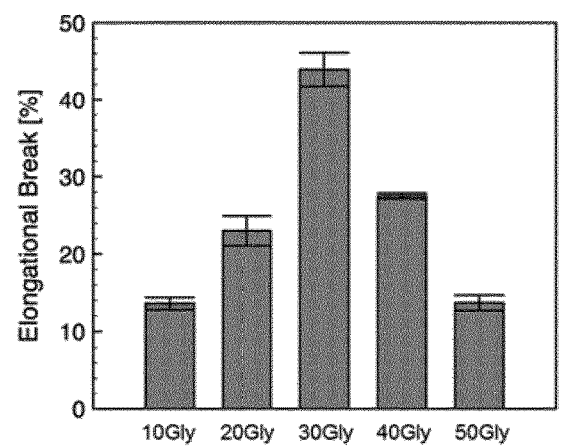

Stress-strain curves are shown for the films of the present invention in FIG. 14a. The Young's modulus of the films is shown in FIG. 14a where it can be seen that increasing the amount of plasticizer reduces the Young's Modulus for the films. The percentage elongation on break is shown in FIG. 14b with the most elongation shown at 30% plasticizer.

The mechanical performance of the films obtained by this approach is superior to those of previously reported films made from commercial soy protein. This is due to the high degree of intermolecular interactions and subsequent self-assembly of protein molecules, as opposed to the weak intermolecular interactions normally present in soy protein films produced by casting monomeric soy protein in high concentrations of chaotropic agents (i.e. 8M urea).

FTIR

In order to investigate the secondary structure and intermolecular interactions in the film, FTIR analysis was performed for the SPI film prepared without addition glycerol.

The data was collected using 128 scans at 4 cm-1 resolution with background subtractions. For the structural analysis of proteins, the spectra were smoothed with a 2nd order and seven-point window Savitzky-Golay filter and normalized. The second derivative in the Amide I band (1600-1700 cm-1) was calculated from the smoothed data to deconvolve and quantify the secondary and quaternary structural contributions.

Figure 15:
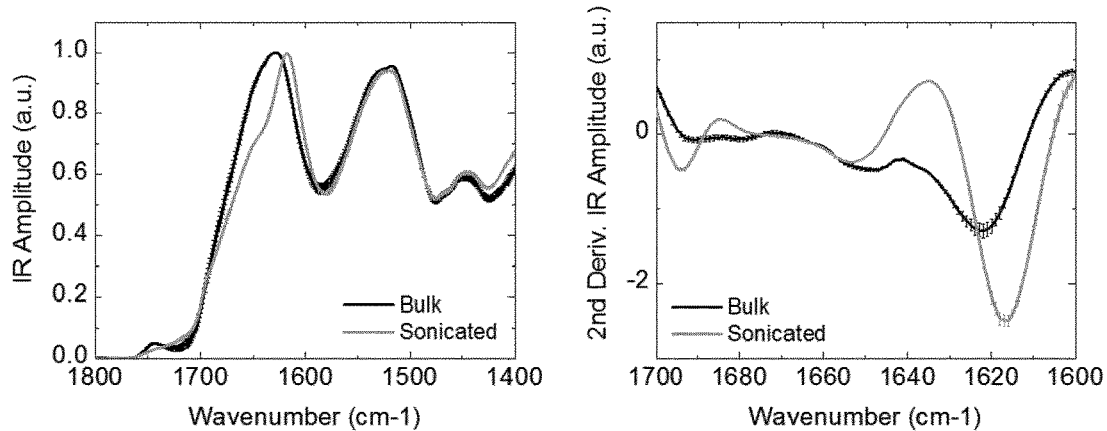
FIG. 15 shows FTIR spectra of a SPI film prepared without the use of glycerol, and a spectra of a commercial SPI dried sample.
Figure 15:
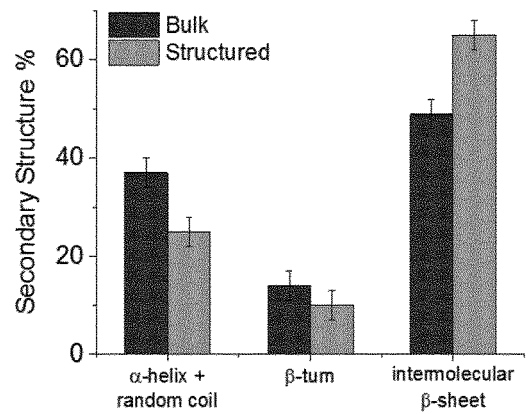

FT-IR analysis of the generated film showed that higher amount of intermolecular β-sheet structures (65%) are present in the film compared to the starting soy protein isolate (FIG. 15)

Transmission Electron Microscopy (TEM) Analysis

Figure 16:
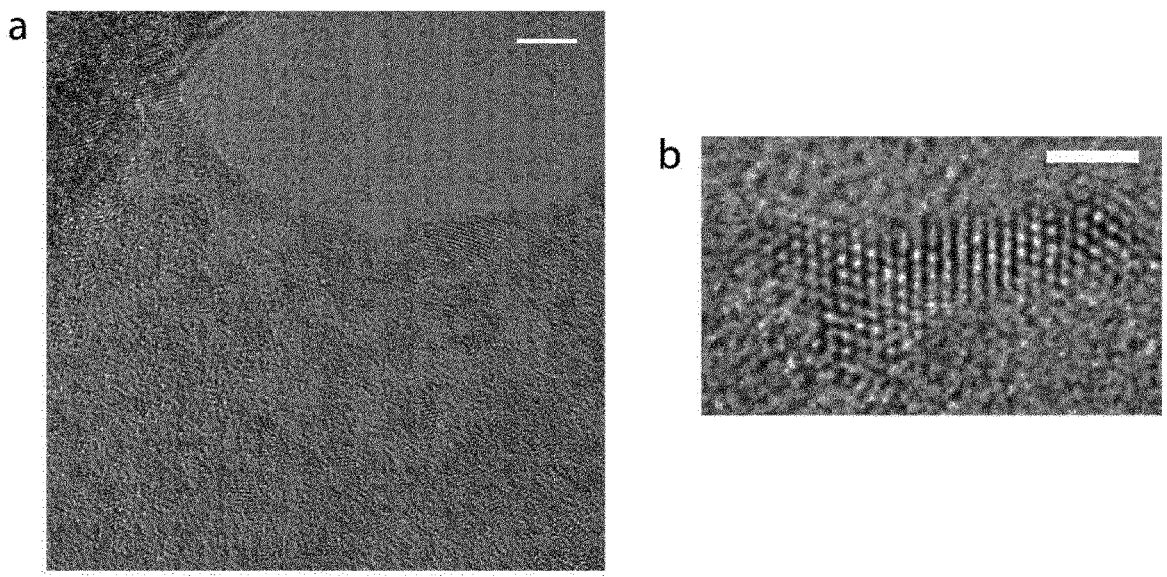
FIG. 16*a* shows a TEM image of a diluted SPI solution dried on a TEM grid, confirming the presence of a substantial amount of β-sheet crystals (scale bar: 5 nm).
FIG. 16*b* shows a close-up image of SPI film β-sheet crystals (scale bar:2 nm)

TEM analysis was performed to investigate the morphology of protein self-assembled structures present in the films. For transmission electron microscopy (TEM) imaging, an SRI sample used for the formation of a film as detailed in Example 9 was diluted to 0.02% concentration and deposited on a TEM grid (C400Cu, EM resolutions), stained with uranyl acetate. FIG. 16 shows the presence of a large proportion of β-sheet crystals, which correlates to the high amount of intermolecular β-sheet structures determined by FTIR.

β-sheet crystals have not previously been seen with plant protein materials. Such crystals share similarities with silk materials which are known to have enhanced mechanical properties including strength. Without wishing to be bound by theory, it is believed that said β-sheet crystals are formed due to the process described by the present invention. Such β-sheet crystals may contribute to the enhanced mechanical properties seen with the plant based materials of the present invention in contrast to plant based gels described in the prior art. The β-sheet crystal data, together with the FTIR, clearly show that materials made according to the present invention have a high degree of intermolecular interactions, which enable them to have properties that have not been reported before for plant materials (such as tensile strength for the films).

The resultant plant based materials of the present invention are therefore different to known plant based gels, and these difference result in markedly improved properties.

Example 10—Microstructure and Nanostructure Patterning

Films made according to Example 9 were micro patterned according to the process below.

In order to pattern microstructures on a protein film, such as micropillars, a negative pattern of a 20 μm×20 μm array of micropillars was fabricated on a silicon wafer through standard photolithographic techniques using SU-8 3025 as a photoresist. A mixture of Polydimethylsiloxane elastomer and curing agent (Sylgard 184, Dow Corning) in a 10:1 ratio was poured onto the wafer and cured at 65° C. for 1 hour. The cured PDMS was peeled off from the wafer and used as a negative pattern for the soy protein film. A soy protein solution, as prepared in Example 9, was casted onto the PDMS and dried overnight. The SPI thin film was peeled off the PDMS master and the resulting micropatterned structures were observed using scanning electron microscopy (SEM) with a 10 nm coating of platinum (MIRA 3 FEG-SEM, TESCAN). The contact angle of the film was measured using a FTA1000B, First Ten Angstroms.

Figure 17A:
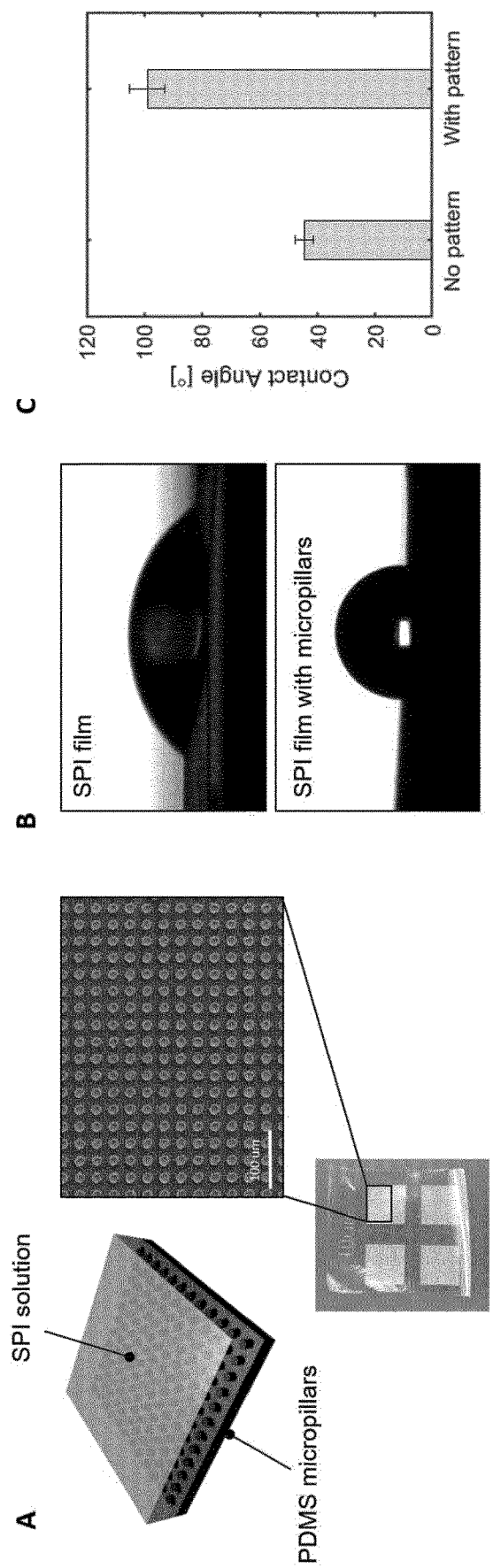
FIG. 17*a* shows the micropatterning of a uniform array of micropillars on a soy protein film surface, which significantly increases the contact angle of a water droplet (99°) in comparison to a non-micropatterned control sample.

By simply casting the sonicated soy protein solution onto a micropatterned substrate, it is possible to fabricate a uniform array of micropillars on the film surface. The contact angle of the micropatterned films was 99°, which is significantly higher from a control film sample with a non-micropatterned surface (FIG. 17a). This clearly shows that by simply patterning micropillars such as the ones naturally present on the lotus leaves on the surface of a plant-based protein film, the hydrophobic surface properties can be greatly enhanced.

Figure 17B:
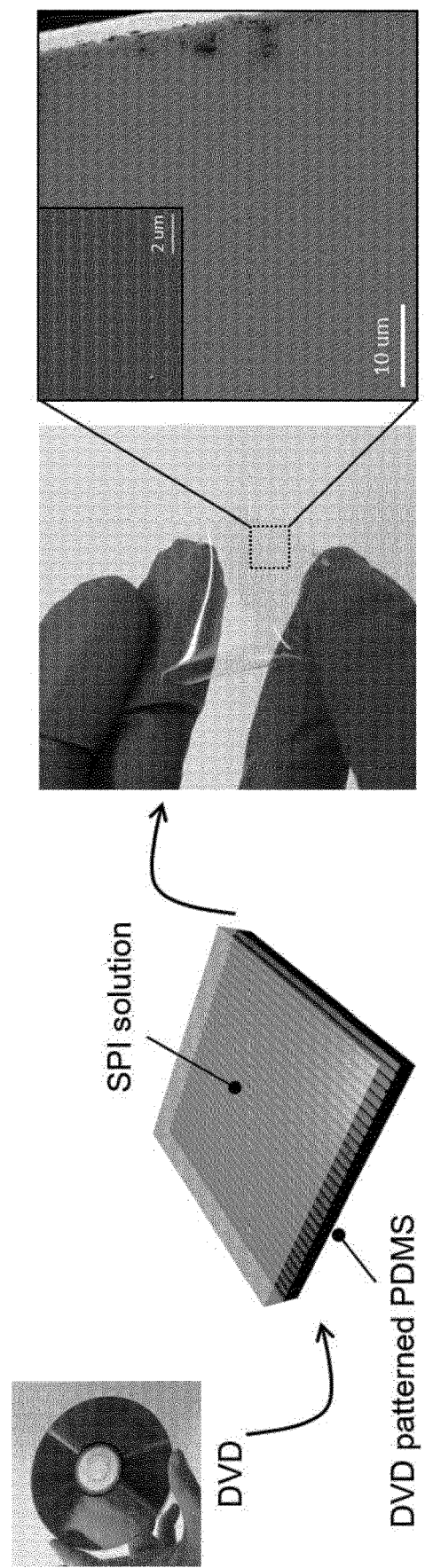
FIG. 17*b* shows the nanopatterning of a uniform array of nanochannels obtained by casting a soy protein film on a DVD disc. Nanostructured motifs on the soy protein film exhibit photonic properties (Mie scattering)

In order to generate nanostructured protein films with photonic properties, a DVD disc was used as a mould substrate. First, the outer plastic layer was carefully removed from the DVD disc and the remaining middle layer was used. PDMS was poured onto DVD substrate and cured for 1 hour at 65° C. The patterned PDMS was peeled off from the DVD substrate, and a film-forming soy protein solution as prepared in Example 9 was cast on the PDMS substrate and dried at room temperature overnight. The SPI thin film was peeled off the PDMS master and the resulting nanopatterned structures were observed using scanning electron microscopy (SEM) with a 10 nm coating of platinum (MIRA 3 FEG-SEM, TESCAN). The photonic properties (Mie scattering) of film could be easily observed by naked eye (FIG. 17b).

Example 11—Preparation of Coatings

In order to test the coating properties of plant-based protein films, a small piece of cardboard (2×2 cm) was dipped into a film-forming SPI solution, as prepared in Example 9, in the absence of plasticisers. After dipping the cardboard in the film-forming solution for approximately 5 seconds, the cardboard was removed from the solution and air-dried at room temperature overnight. After complete drying, the protein-coated cardboard was immersed in 10 mL of deionised water to measure the cardboard's water uptake. The water uptake was calculated by measuring the weight increase of the cardboard when immersed in deionised water at different time intervals.

As control samples, an uncoated cardboard piece and a soy protein monomer-coated cardboard (prepared by dipping the cardboard into a soy protein solution prepared under alkaline conditions (pH=9)) were tested. The water uptake was normalised with the initial weight measured before soaking the cardboard samples in water.

Figure 18:
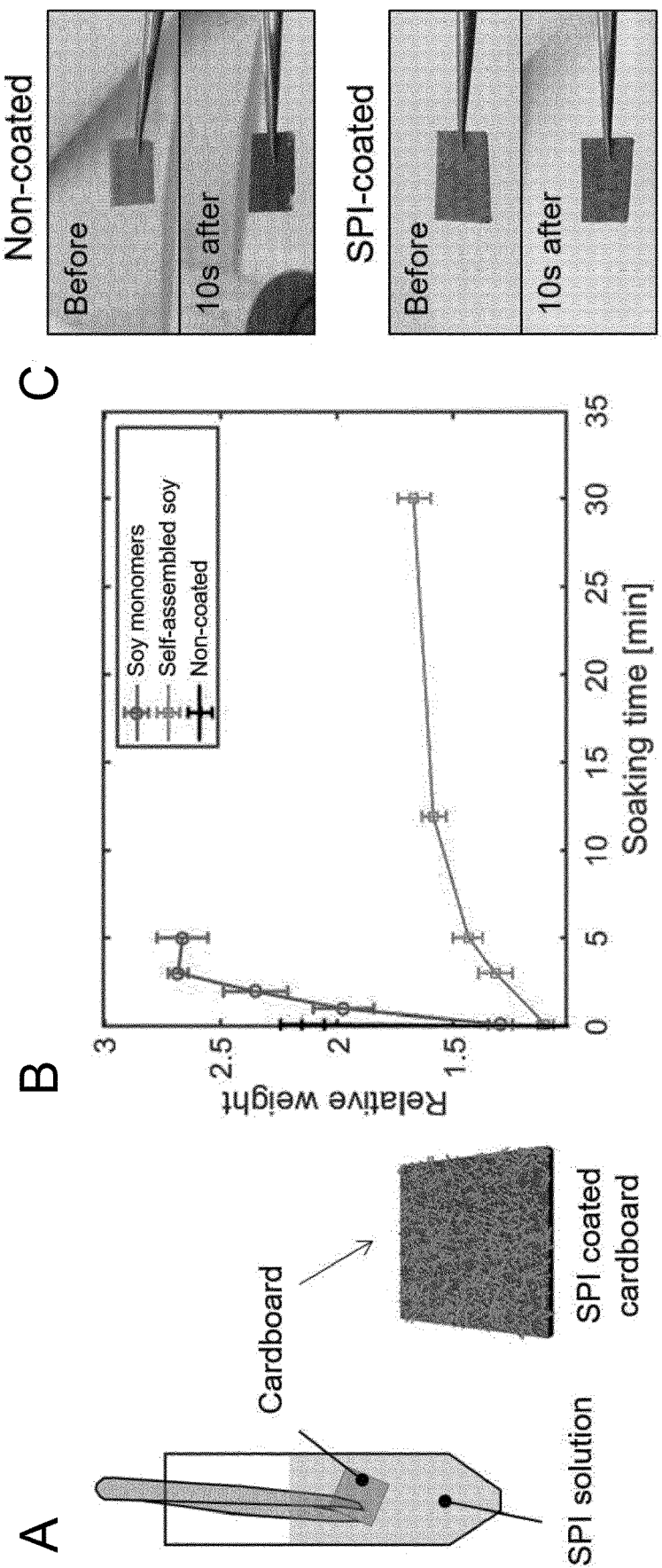
FIG. 18 shows a schematic process to produce soy protein film coatings on a cardboard substrate. The soy protein film coated substrate shows a 50% water-uptake decrease when compared to an uncoated control sample.

As observed in FIG. 18, the non-coated cardboard control sample exhibits a very high-water uptake after immersion for 10 seconds in water. The amount of water uptake in the SPI-coated cardboard was reduced by almost 50% compared to the uncoated control sample or the cardboard sample coated with a Soy protein solution prepared under alkaline conditions, which also exhibited a very low water resistance. These result highlight that coatings generated from plant-based protein films assembled from proteins with a high-degree of intermolecular interactions exhibit enhanced water-barrier properties.

Example 12—Hard Capsule Manufacturing

Figure 19A:
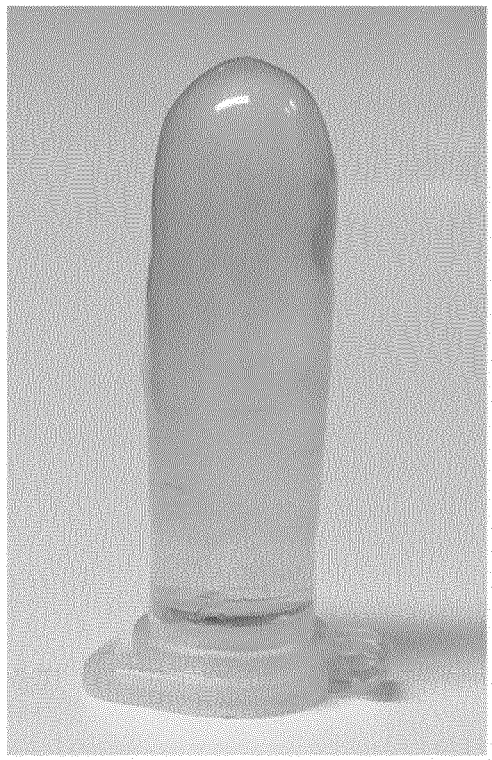
FIG. 19*a* shows the formation of a thin 3-dimensional hydrogel layer around a 2-ml Eppendorf tube substrate.
Figure 19B:
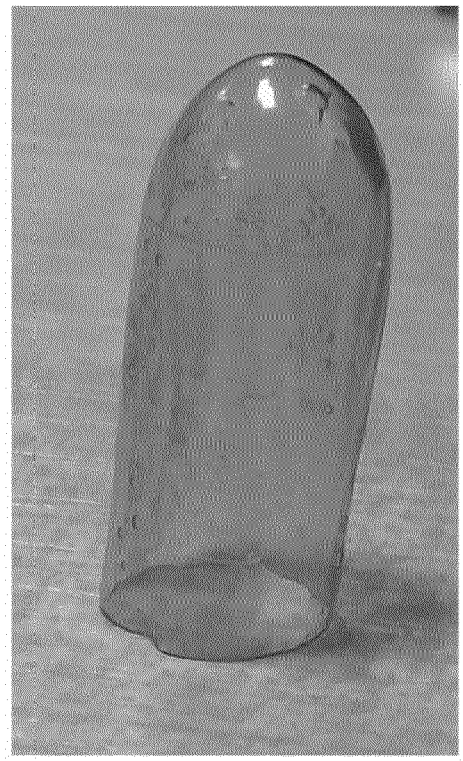
FIG. 19*b* shows a soy protein hard capsule obtained after drying the moulded 3-dimensional hydrogel and removing it from the substrate.

Soy protein hard capsules were manufactured according to the present invention. A 100 mg/ml SPI solution was first prepared by dissolving 5 g of SPI into 50 ml of an aqueous solution containing acetic acid (40% v/v). The protein dispersion was heated at 95° C. for 30 min, followed by exposure to ultrasonication for 5 min (High-Frequency Power Output=70 W, Frequency=20 KHz, Amplitude=90%). The solution was kept at 85° C. to prevent gelation. A 2 ml Eppendorf tube was dipped into the heated solution, then kept into the liquid solution for 5 seconds and subsequently removed. A thin layer of SPI hydrogel formed around the outer surface of the 2 ml Eppendorf tube within seconds after removing it from the liquid SPI solution (FIG. 19a). The vial was then placed in an oven at 45° C. for one hour to ensure the evaporation of the water/acetic acid solvent fraction within the hydrogel layer to generate a 3-dimensional thin film. After evaporation of the solvent, the hard capsule was removed from the Eppendorf tube (FIG. 19b).

This is the first example showing the formation of hard capsules produced from plant-based proteins. This process is only possible due to thermally reversible properties of these plant-based materials, which enable the formation of a thin 3-dimensional hydrogel on the substrate.

Example 13—Pea and Potato Protein Materials

The procedures described in Example 1, Example 3 and Example 9 were followed to produce protein hydrogels, microgels and films by using Pea Protein Isolate (80%) and potato protein isolate as starting materials.

Figure 20:
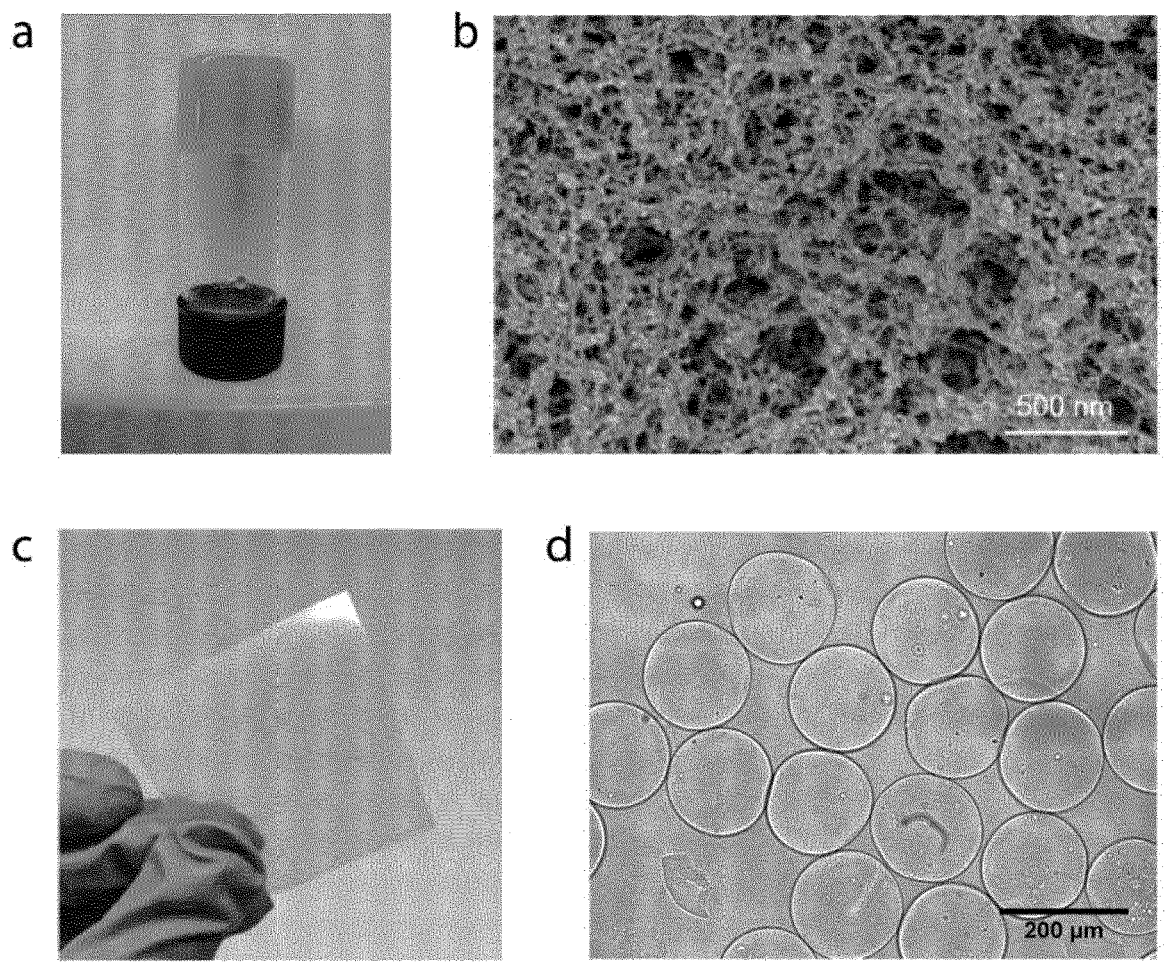
FIG. 20*a* shows a Pea Protein Hydrogel produced using a 30% v/v co-solvent ratio.
FIG. 20*b* shows a SEM (Scanning electron microscopy) image of a Pea Protein Hydrogel produced using a 30% v/v co-solvent ratio.
FIG. 20*c* shows a Pea Protein isolate film.
FIG. 20*d* shows stable Pea Protein microgels suspended in aqueous solution (pH=2)

FIG. 20a shows a translucent and self-standing Pea Protein hydrogel observable after vial inversion.

Figure 21:
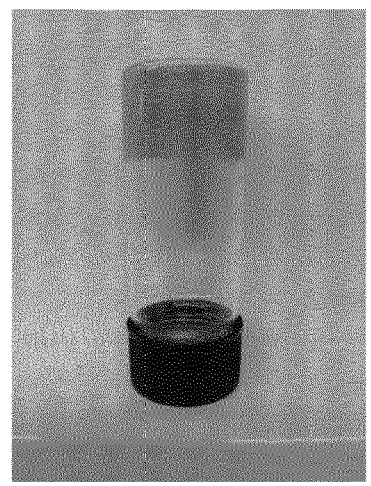
FIG. 21 shows a potato protein hydrogel prepared from a 100 mg/ml potato protein isolate solution in 30% (v/v) aqueous acetic acid solution.

Similar properties as described herein were also seen with potato protein as shown in FIG. 21, which shows a potato protein hydrogel prepared from a 100 mg/ml potato protein isolate solution in 30% (v/v) aqueous acetic acid solution.

Example 13 shows the versatility of the processes of the present invention working across a range of plant based protein sources.

Example 14—Stress Strain Film Analysis

Figure 22A:
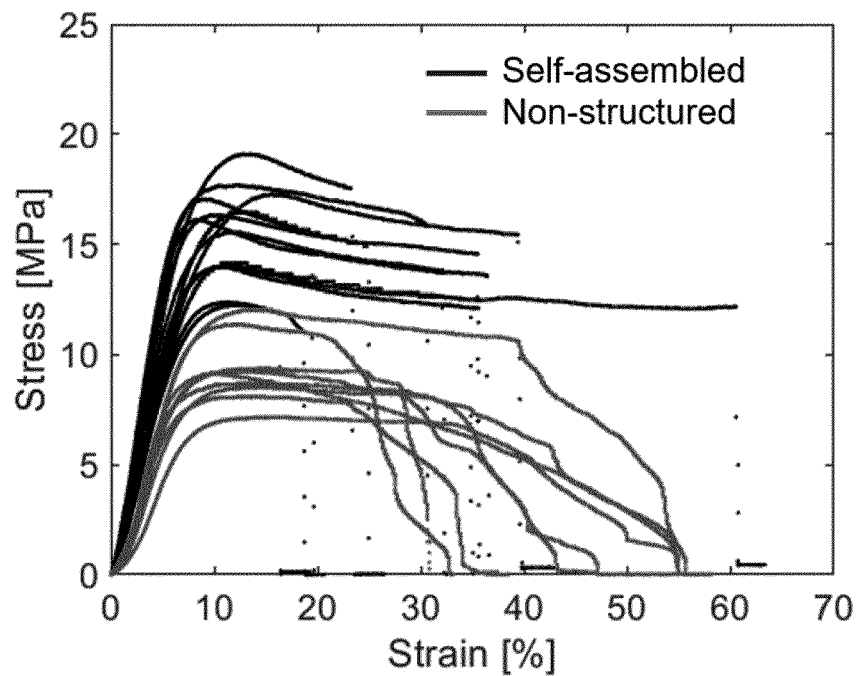
FIG. 22 shows stress-strain curves for further films made according to the present invention.

Stress-strain curves are shown for the films of the present invention in FIG. 22. FIG. 22a shows stress-strain curves for films made according to the present invention. Strain-stress curves for a self-assembled sample (blue) correspond to a SPI film prepared from a 30% (v/v) acetic acid aqueous solution in the presence of 30% glycerol (w/w, relative to the dry protein weight). Strain-stress curves for a non-structured sample (red) correspond to a SPI film prepared in an alkaline aqueous solution adjusted to pH=10 using NaOH in the presence of 30% glycerol (w/w, relative to the dry protein weight).

Figure 22B:
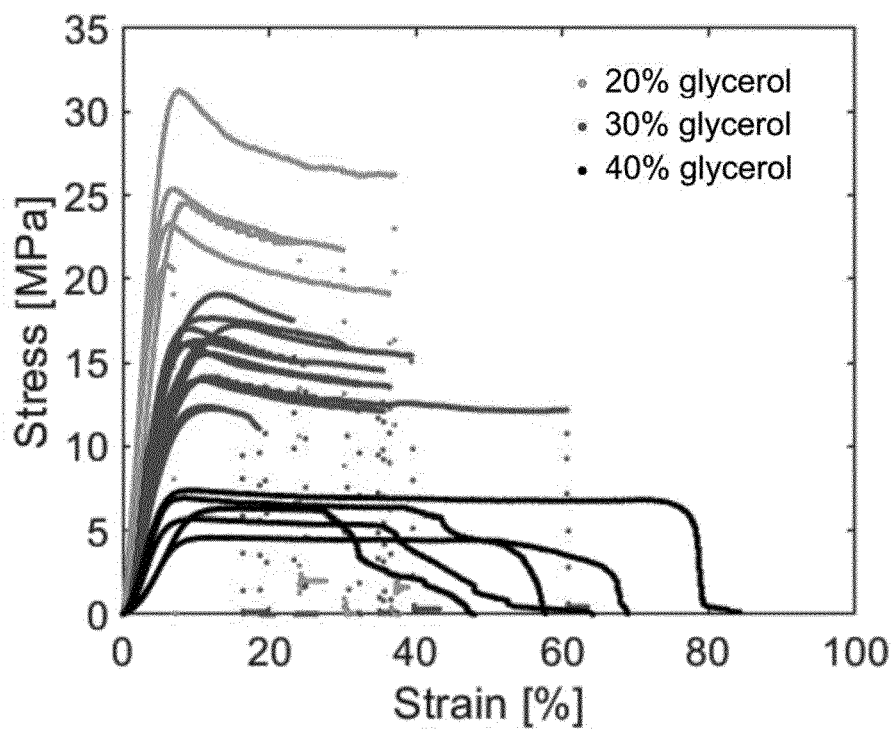

FIG. 22b shows strain-stress curves for SPI films prepared from 30% (v/v) acetic acid aqueous solution in the presence of different amounts of glycerol as a plasticiser (20% to 40% w/w, relative to the dry protein weight).

The self-assembled SPI films prepared with 30% (w/w) glycerol exhibit high tensile strength (15.6±2.07 MPa) and Young's modulus (209±39.1 MPa,).

It can be seen that varying the amount of glycerol enables tailoring of the mechanical performance of the hydrogel. For example, mechanical performance changed from 483 ±58.4 MPa to 92.7±25.3 MPa for Young's Modulus and 25.0±3.49 MPa to 6.18±0.98 MPa for tensile strength, when the concentration of glycerol was varied from 20-40% (w/w). The tensile strength and Young's modulus of the self-assembled films with 30 w/w % glycerol was found to be higher than values for non-structured films with 30% (w/w) glycerol (131±22.6 MPa and 9.30±1.53 MPa for Young's Modulus and tensile strength respectively).

Samples in Example 14 were prepared as follows:

500 mg of SPI was dispersed in 5 mL of 30% (v/v) acetic acid aqueous solution and shaken well until a turbid and highly viscous dispersion was obtained. This was then sonicated using ultrasonic homogenizers (Bandelin, HD4200) for 30 minutes with 25% power (pulse durations of on-time 0.7 second and off-time 0.3 second). Following sonication, glycerol (99.5%, Sigma-Aldrich) was added as a plasticizer at various concentrations (20, 30 or 40 w/w %) and the solution was sonicated for an additional 1 minute. The hot liquid solution was immediately cast on a 7 cm glass petri dish pre-heated at 90° C. The cast solution was then dried for 3 days at room temperature (19-22° C.) and ambient humidity (typically 50-70%). The dried film was then removed from the mould and stored in a humidity-controlled chamber (50%) until further use.

As a control experiment, films were also prepared in alkaline aqueous solution, where a 100 mg/ml SPI dispersion was prepared in a pH=10 (adjusted with NaOH) aqueous solution and heated for 30 minutes at 95° C. without sonication (referred as non-structured SPI). 30% (w/w) glycerol was then added, the hot liquid solution was cast on the glass petri dish and dried for 3 days.

Example 15—Comparison of Acetic Acid Vs HCl Vs NaOH

A comparative experiment was conducted to evaluate the difference between hydrogels made according to the present invention with acetic acid, and methods using HCl or NaOH (which do not undergo a sol-gel transition). The results are shown in FIG. 23.

Figure 23:
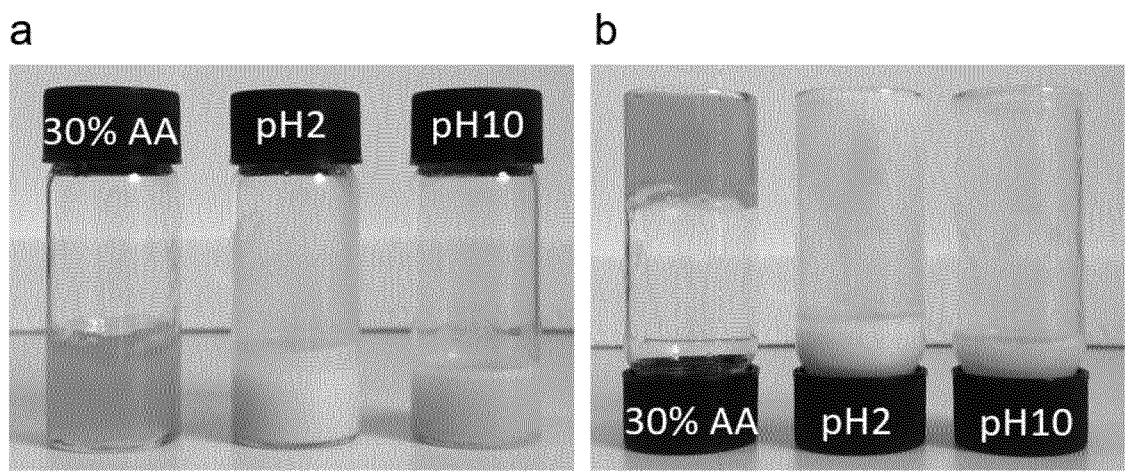
FIG. 23 shows optical images of gelation using acetic acid according to the present invention and HCl or NaOH.

FIG. 23 shows optical images of a 100 mg/ml SPI dispersion prepared in different aqueous solutions through ultra-sonication treatment at elevated temperature. (a) SPI dispersion in 30% (v/v) acetic acid aqueous solution (left), acidic aqueous solution adjusted to pH=2 using HCl (middle) and alkaline aqueous solution adjusted to pH=10 using NaOH after 30 minutes sonication (right). (b) Glass vials are inverted to show that the gelation is only observed for the SRI solution prepared in 30% (v/v) acetic acid. The HCl and NaOH vials show that no sol-gel transition takes place.

In conclusion, the present invention has provided for solvent systems as described herein which enable a method to disrupt intermolecular interactions at high temperature and high-shear. This allows for the selective promotion of the formation of intermolecular interactions upon a temperature change. Such an approach allows for the moulding of the material into different shapes. This has hitherto not been possible for plant sourced materials.

As such, the present invention may be directed towards a method of moulding plant-sourced material, comprising the methods as described herein.

In addition, the present invention creates protein secondary structure of the self-assembled material having a higher amount of intermolecular β-sheet structures (compared to the protein starting material). Such novel materials have not been seen in existing plant sourced materials. This novel secondary structure gives the materials unique properties, such as higher tensile film strength.

No doubt many other effective alternatives will occur to the skilled person. It will be understood that the invention is not limited to the described embodiments and encompasses modifications apparent to those skilled in the art and lying within the spirit and scope of the claims appended hereto.

REFERENCES

1. Ahnert, S. E., Marsh, J. A., Hernández, H., Robinson, C. V. & Teichmann, S. A. Principles of assembly reveal a periodic table of protein complexes. *Science* (80-.). 350, (2015).
2. Mezzenga, R. & Fischer, P. The self-assembly, aggregation and phase transitions of food protein systems in one, two and three dimensions. *Reports Prog. Phys.* 76, (2013).

3. Knowles, T. P. J. & Mezzenga, R. Amyloid Fibrils as Building Blocks for Natural and Artificial Functional Materials. *Adv. Mater.* 6546-6561 (2016). doi:10.1002/adma.201505961
4. Shimanovich, U. et al. Protein Microgels from Amyloid Fibril Networks. *ACS Nano* 9, 43-51 (2014).
5. Zhou, X. M. et al. Enzymatically Active Microgels from Self-Assembling Protein Nanofibrils for Microflow Chemistry. *ACS Nano* 9, 5772-5781 (2015).
6. Shen, Y. et al. Amyloid fibril systems reduce, stabilize and deliver bioavailable nanosized iron. *Nat. NanotechnoL* 12, 642-647 (2017).
7. Nystrom, G., Fong, W. K. & Mezzenga, R. Ice-Templated and Cross-Linked Amyloid Fibril Aerogel Scaffolds for Cell Growth. *Biomacromolecules* 18, 2858-2865 (2017).
8. Amagliani, L. & Schmitt, C. Globular plant protein aggregates for stabilization of food foams and emulsions. *Trends Food Sci. Technol.* 67, 248-259 (2017).
9. Munialo, C. D., Martin, A. H., Van Der Linden, E. & De Jongh, H. H. J. Fibril formation from pea protein and subsequent gel formation. *J. Agric. Food Chem.* 62, 2418-2427 (2014).
10. Munialo, C. D., van der Linden, E. & de Jongh, H. H. J. The ability to store energy in pea protein gels is set by network dimensions smaller than 50 nm. *Food Res. Int.* 64, 482-491 (2014).
11. Lee, K. H., Ryu, H. S. & Rhee, K. C. Protein solubility characteristics of commercial soy protein products. *JAOCS, J. Am. Oil Chem. Soc.* 80, 85-90 (2003).
12. Lee, H. et al. Soy protein nano-aggregates with improved functional properties prepared by sequential pH treatment and ultrasonication. *Food Hydrocoll.* 55, 200-209 (2016).
13. Jiang, S. et al. Modifying the physicochemical properties of pea protein by pH-shifting and ultrasound combined treatments. *Ultrason. Sonochem.* 38, 835-842 (2017).
14. Mason, T. O. et al. Expanding the solvent chemical space for self-assembly of dipeptide nanostructures. *ACS Nano* 8, 1243-1253 (2014).
15. Li, Y. et al. Understanding the dissolution of α-zein in aqueous ethanol and acetic acid solutions. *J. Phys. Chem. B* 116, 12057-12064 (2012).
16. Akkermans, C. et al. Micrometer-sized fibrillar protein aggregates from soy glycinin and soy protein isolate. *J. Agric. Food Chem.* 55, 9877-9882 (2007).

The invention claimed is:

1. A thermoreversible process to obtain plant-based hydrogels comprising:
    a) forming a solution comprising one or more plant-based protein(s) in a solvent system, wherein the one or more plant-based protein(s) are selected from the group consisting of soybean, pea, rice, potato, wheat, or sorghum, and the solvent system comprises miscible co-solvents; wherein a first co-solvent increases solubility of the plant-based protein(s), and a second co-solvent decreases solubility of the plant based protein(s); and
    b) inducing the protein in the solution to undergo a sol-gel transition to form a plant-based protein hydrogel.

2. The method according to claim 1, further comprising:
    c) forming the plant-based protein hydrogel into a structured material selected from the group consisting of a film, a thin film, a micropatterned film, a micropatterned thin film, a microstructured thin film, a nanostructured thin film, a microgel, a microcapsule, a microbead, a bioscaffold, a bio-support, a sponge, a microscale-sponge, a hard capsule, or a functional coating.

3. The method according to claim 1, wherein the first co-solvent is an organic acid selected from the group consisting of acetic acid, glycolic acid, lactic acid, malic acid, citric acid and/or tartaric acid; and/or wherein a second or further co-solvent(s) is an aqueous buffer selected from the group consisting of water, ethanol, methanol, acetone, acetonitrile, dimethylsulfoxide, dimethylformamide, formamide, 2-propanol, 1-butanol, 1-propanol, hexanol, t-butanol, ethyl acetate or hexafluoroisopropanol.

4. The method according to claim 1, wherein solvent system comprises a ratio of the first co-solvent to the second co-solvent of about 20-80% v/v.

5. The method according to claim 1, further comprising mechanical shear of said protein solution comprising one or more plant-based protein(s) and a solvent system.

6. The method of claim 1, wherein the solvent system is thereafter removed such that the plant-based protein hydrogel no longer has thermoreversible properties.

7. The method of claim 1, wherein the solution is heated to a first temperature above the sol-gel temperature of the one or more plant-based protein(s), then reduced to a second temperature below the sol-gel temperature of the one or more plant-based protein(s).

\* \* \* \* \*